(12) United States Patent
Lee

(10) Patent No.: US 11,693,566 B2
(45) Date of Patent: Jul. 4, 2023

(54) STORAGE DEVICE AND STORAGE SYSTEM FOR STORING SENSOR DATA IN AN AUTONOMOUS VEHICLE

(71) Applicant: Samsung Electronics Co., Ltd., Suwon-si (KR)

(72) Inventor: Daeyoung Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 17/498,934

(22) Filed: Oct. 12, 2021

(65) Prior Publication Data

US 2022/0269422 A1 Aug. 25, 2022

(30) Foreign Application Priority Data

Feb. 22, 2021 (KR) .................... 10-2021-0023137

(51) Int. Cl.
*G06F 12/00* (2006.01)
*G06F 3/06* (2006.01)
*G06F 11/30* (2006.01)

(52) U.S. Cl.
CPC .......... *G06F 3/0619* (2013.01); *G06F 3/0656* (2013.01); *G06F 3/0659* (2013.01);
(Continued)

(58) Field of Classification Search
CPC .... G06F 3/0619; G06F 3/0656; G06F 3/0659; G06F 3/0683; G06F 11/3034; G06F 11/3058; G06F 17/40; G06F 3/0608; G06F 3/0616; G06F 3/0638; G06F 3/0658; G06F 3/0604; G06F 3/0649; B60W 50/023; B60W 2050/0005; B60W 40/02; B60W 50/04; B60W 60/001; B60W 2420/00;
(Continued)

(56) References Cited

U.S. PATENT DOCUMENTS 9,304,930 B2  4/2016  Shu et al.
10,733,100 B2  8/2020  Benisty
(Continued)

FOREIGN PATENT DOCUMENTS

KR  10-2011-0029683 A  3/2011
KR  10-2012-0130316 A  11/2012
(Continued)

*Primary Examiner* — Mardochee Chery
(74) *Attorney, Agent, or Firm* — Muir Patent Law, PLLC

(57) ABSTRACT

A storage device includes a first memory device, a second memory device and a storage controller. The first memory device buffers a plurality of unit time interval data. The plurality of unit time interval data are received in each of a plurality of monitoring time intervals. The second memory device stores at least one of the plurality of unit time interval data. The storage controller controls an amount of data flushed from the first memory device to the second memory device based on one of first and second flush commands. The storage controller compares a shock measurement value representing a magnitude of an external shock with a shock reference value. When the shock measurement value is less than or equal to the shock reference value, the storage controller provides the first flush command to the first memory device to flush first unit time interval data.

20 Claims, 20 Drawing Sheets

(52) U.S. Cl.
CPC ........ *G06F 3/0683* (2013.01); *G06F 11/3034*
(2013.01); *G06F 11/3058* (2013.01)

(58) Field of Classification Search
CPC .......... G06N 3/04; G06N 3/08; B60R 21/013;
B60Y 2400/30
USPC ........................................................ 711/154
See application file for complete search history.

(56) References Cited

U.S. PATENT DOCUMENTS

| | | |
|---|---|---|
| 2009/0024274 A1 | 1/2009 | Nagai |
| 2012/0254502 A1 | 10/2012 | Cho |
| 2018/0074728 A1 | 3/2018 | Chahwan et al. |
| 2019/0325763 A1* | 10/2019 | Hux ...................... G06T 19/006 |
| 2021/0090356 A1* | 3/2021 | Golov .................... G07C 5/085 |

FOREIGN PATENT DOCUMENTS

| | | | | |
|---|---|---|---|---|
| KR | 10-2014-0076453 A | | 6/2014 | |
| KR | 10-2014-0088725 A | | 7/2014 | |
| KR | 20220127329 A | * | 9/2022 | |

\* cited by examiner

FIG. 2
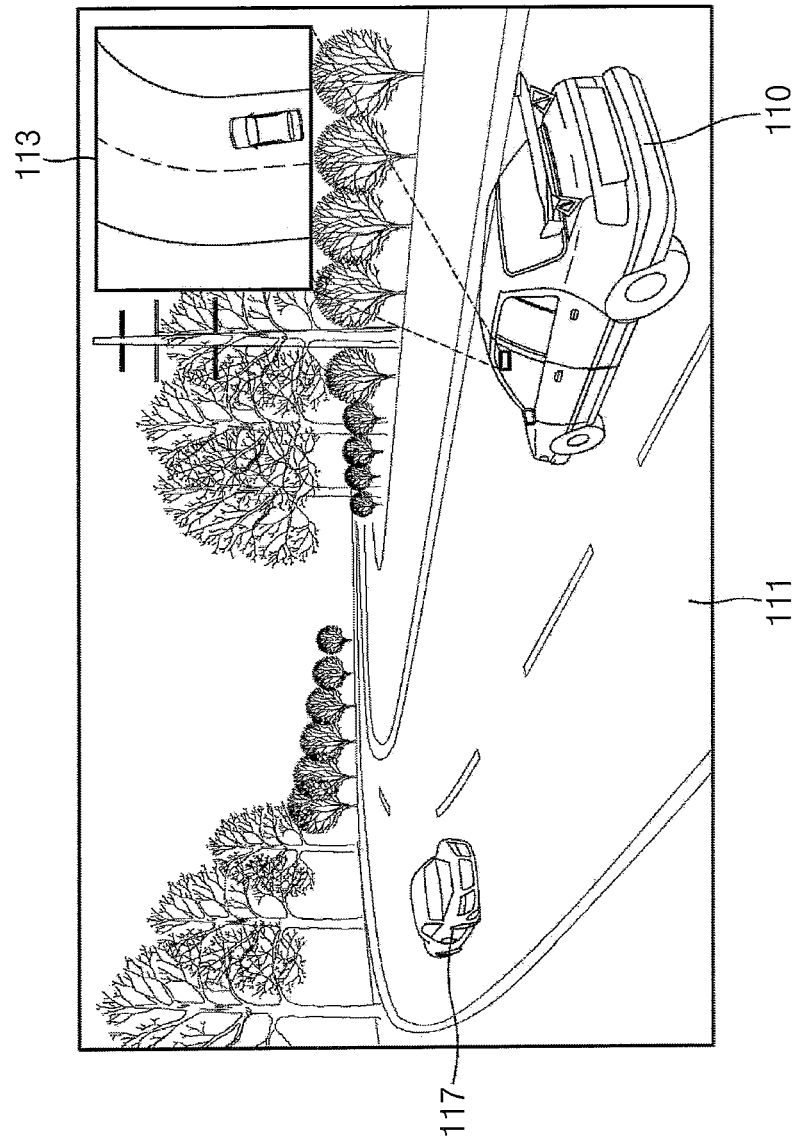
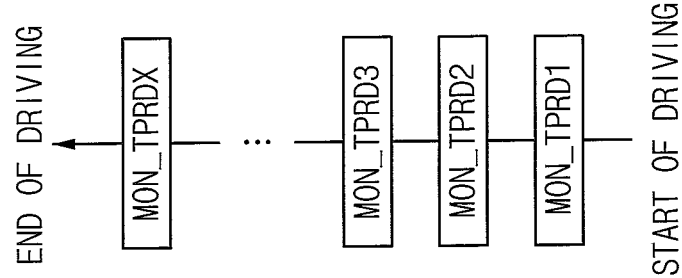

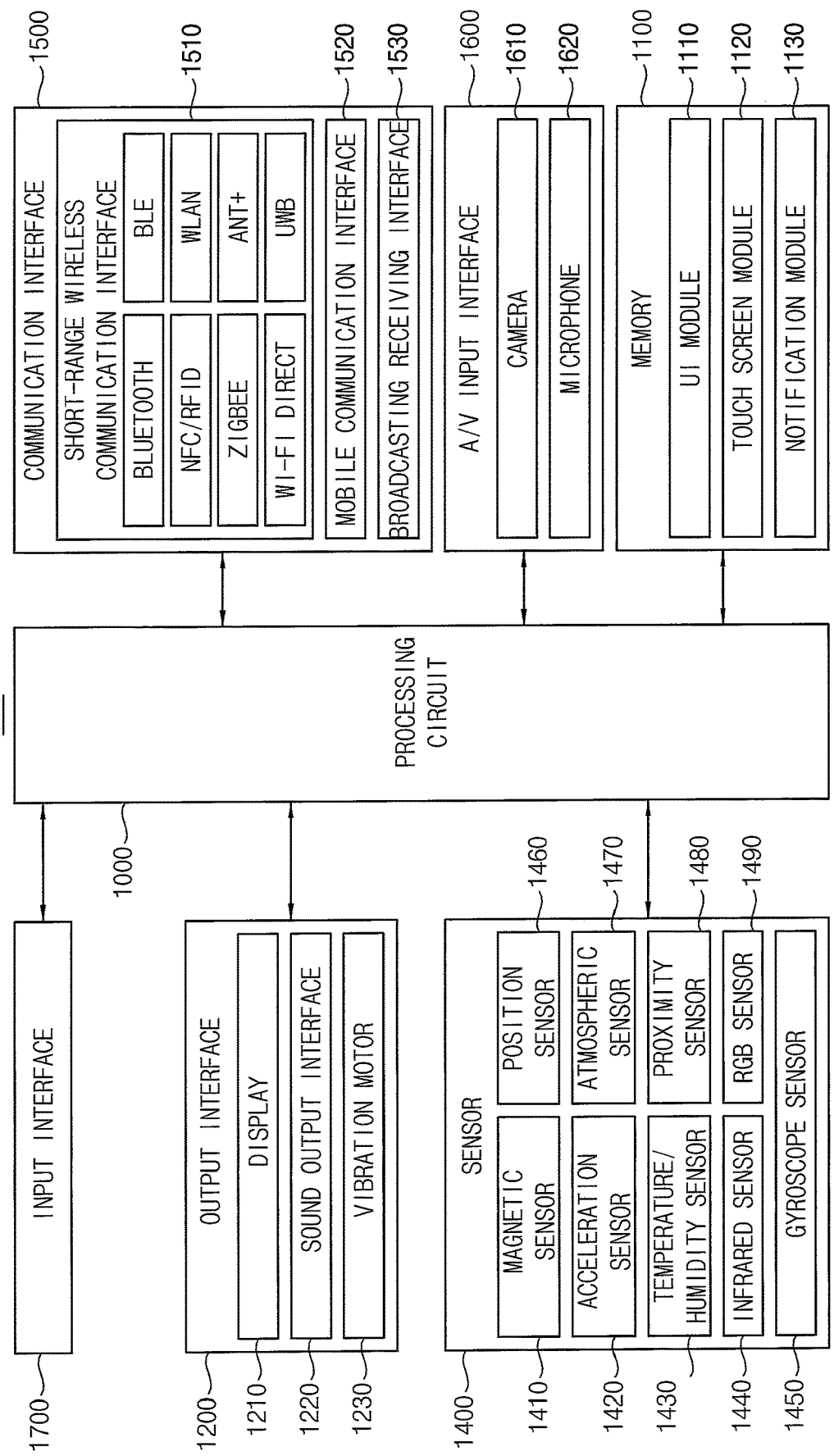

STORAGE DEVICE AND STORAGE SYSTEM FOR STORING SENSOR DATA IN AN AUTONOMOUS VEHICLE

CROSS-REFERENCE TO RELATED APPLICATION

This U.S. non-provisional application claims the benefit of priority under 35 U.S.C. § 119 to Korean Patent Application No. 10-2021-0023137, filed on Feb. 22, 2021, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a storage device and a storage system including the storage device.

2. Discussion of the Related Art

A storage device may be classified into a volatile storage device including volatile memories and a nonvolatile storage device including nonvolatile memories depending on whether stored data is lost when power is cut off. The volatile memories read and write fast, however, stored data are lost when the power is cut off. The nonvolatile memories retain the stored data even if the power is cut off. Therefore, the nonvolatile memories are used to store data to be preserved regardless of whether the power is cut off. As the storage device including nonvolatile memories is widely used, the storage device is included in an autonomous vehicle and is used to store various sensor data generated during driving of the autonomous vehicle. However, since a driving environment and a driving condition of the autonomous vehicle are different from those used in the storage device in a general environment, the storage device used in the autonomous vehicle must satisfy strict performance standards.

SUMMARY

Some example embodiments may provide a storage device and a storage system, capable of reducing the number of programs and the amount of data to be programmed.

According to example embodiments, a storage device includes a first memory device, a second memory device and a storage controller. The first memory device buffers a plurality of unit time interval data. The plurality of unit time interval data are received in each of a plurality of monitoring time intervals for an autonomous driving control. The second memory device stores at least one of the plurality of unit time interval data. The storage controller controls an amount of data flushed from the first memory device to the second memory device based on one of first and second flush commands. The storage controller compares a shock measurement value representing a magnitude of an external shock with a shock reference value. When the shock measurement value is less than or equal to the shock reference value, the storage controller provides the first flush command to the first memory device to flush first unit time interval data among the plurality of unit time interval data to the second memory device. When the shock measurement value is greater than the shock reference value, the storage controller provides the second flush command to the first memory device to flush the first unit time interval data and second unit time interval data among the plurality of unit time interval data to the second memory device.

According to example embodiments, a storage system includes a host device and a storage device. The host device stores a plurality of unit time interval data that are received in each of a plurality of monitoring time intervals for an autonomous driving control. The host device issues a write request for at least one of the plurality of unit time interval data. The storage device includes a first memory device, a second memory device and a storage controller. The first memory device buffers data transmitted from the host device among the plurality of unit time interval data based on the write request. The second memory device stores data flushed from the first memory device. The storage controller controls the first memory device and the second memory device. When a predetermined first condition is satisfied, the host device transmits first unit time interval data among the plurality of unit time interval data to the storage device. The storage controller flushes the first unit time interval data from the first memory device to the second memory device.

According to example embodiments, a storage device includes a first memory device, a second memory device and a storage controller. The first memory device buffers a plurality of unit time interval data including a plurality of sensor data received in each of a plurality of monitoring time intervals for an autonomous driving control. The second memory device stores at least one of the plurality of unit time interval data. The storage controller includes a shock sensor. The shock sensor senses an external shock applied while an autonomous vehicle is driving and outputs a shock measurement value. The storage controller controls an amount of data flushed from the first memory device to the second memory device based on one of first and second flush commands. When the shock measurement value is less than or equal to the shock reference value, the storage controller provides the first flush command to the first memory device to flush first unit time interval data among the plurality of unit time interval data to the second memory device. When the shock measurement value is greater than the shock reference value, the storage controller provides the second flush command to the first memory device to flush the first unit time interval data and second unit time interval data among the plurality of unit time interval data to the second memory device. The storage controller provides a third flush command to the first memory device to flush all of the plurality of unit time interval data to the second memory device regardless of the shock measurement value.

As described above, the storage device and the storage system may reduce the number of programs and an amount of data to be programmed associated with the second memory device. Accordingly, a lifetime of the second memory device including a plurality of nonvolatile memories may be effectively increased.

BRIEF DESCRIPTION OF THE DRAWINGS

Example embodiments of the present disclosure will be more clearly understood from the following detailed description taken in conjunction with the accompanying drawings.

FIG. 2 is a diagram for describing an autonomous vehicle including the storage device in FIG. 1.

FIG. 21 is a block diagram illustrating an electronic device including a storage device, according to example embodiments.

DETAILED DESCRIPTION OF THE EMBODIMENTS

Figure 1:
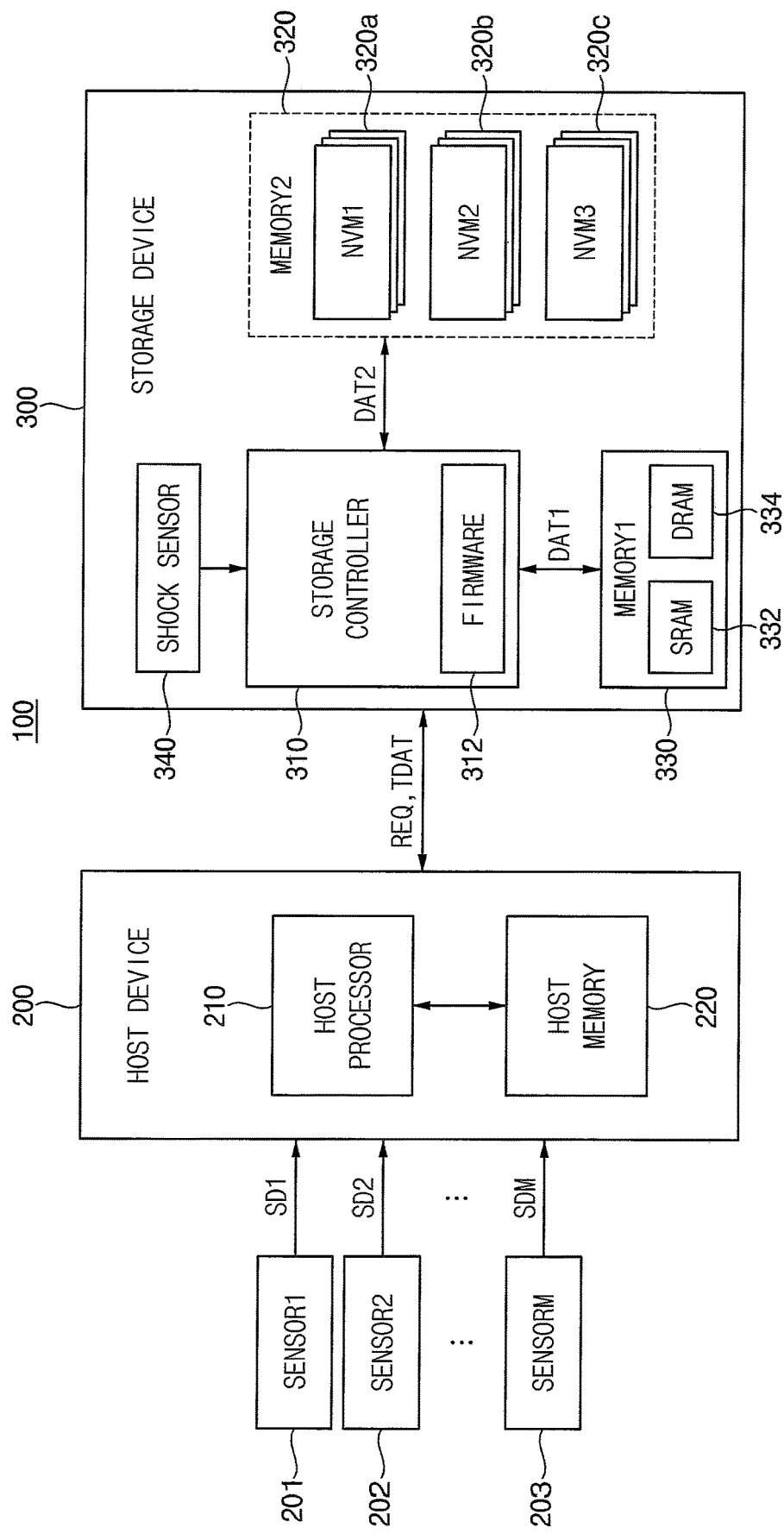
FIG. 1 is a block diagram illustrating a storage device and a storage system including the storage device, according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a storage device and a storage system including the storage device, according to example embodiments.

Referring to FIG. 1, a storage system 100 may include a host device 200 and a storage device 300.

In some embodiments, the storage system 100 may be included, for example, in an autonomous vehicle. The autonomous vehicle may include a plurality of sensors (e.g., SENSOR1, SENSOR2, . . . SENSORM) 201, 202, and 203, and the plurality of sensors 201, 202, and 203 may generate a plurality of sensor data SD1, SD2, and SDM while the autonomous vehicle is driving. The storage system 100 may be mounted inside the autonomous vehicle and may function as a storage space for storing all or a portion of the plurality of sensor data SD1, SD2, and SDM generated while the autonomous vehicle is driving.

In some embodiments, the plurality of sensors 201, 202, and 203 may include at least one of an acceleration sensor, a geomagnetic sensor, a position sensor, a barometric pressure sensor, a temperature/humidity sensor, a proximity sensor, an infrared sensor, a gyroscope sensor, a camera sensor, a radar sensor, and a lidar sensor. As will be described with reference to FIG. 2, the plurality of sensor data SD1, SD2, and SDM may be generated in each of a plurality of monitoring time intervals defined during a driving time of the autonomous vehicle. Hereinafter, the plurality of sensor data SD1, SD2, and SDM generated in each of the plurality of monitoring time intervals will be referred to as 'a plurality of unit time interval data'. In this case, the host device 200 may store the plurality of time interval data generated in each of the plurality of monitoring time intervals by the plurality of sensors 201, 202 and 203 sequentially, and provide at least one of the plurality of unit time interval data to the storage device 300.

In some embodiments, the storage device 300 may store data provided form the host device 200. In this case, the storage device 300 may perform a function such as a black box for the autonomous vehicle.

The host device 200 may control overall operations of the storage system 100. In some embodiments, the host device 200 may include a host processor 210 and a host memory 220. The host processor 210 may control operations of the host device 200. For example, the host processor 210 may execute an operating system (OS). For example, the OS may include a file system for managing files and a device driver for controlling peripheral devices including the storage device 300 at an operating system level. For example, the host processor 210 may include any processor such as a central processing unit (CPU). The host memory 220 may store at least one of the plurality of unit time interval data, and store instructions and data executed and processed by the host processor 210. For example, the host memory 220 may include a volatile memory such as a dynamic random access memory (DRAM).

The storage device 300 may be accessed by the host device 200. For example, the host device 200 may access the storage device 300 to store data in and/or retrieve data from the storage device 300.

In some embodiments, the storage device 300 may include a storage controller 310, a first memory device (MEMORY1) 330 and a second memory device (MEMORY2) 320. The first memory device 330 may include a static random access memory (SRAM) 332 and a dynamic random access memory (DRAM) 334, and the second memory device 320 may include a plurality of nonvolatile memories (e.g., NVM1, NVM2, and NVM3) 320a, 320b, and 320c. The first memory device 330 may function as a buffer memory for the second memory device 320. In this case, the first memory device 330 may basically perform a first in first out (FIFO) operation (i.e., 'buffering') on data provided from the storage controller 310. Data stored in the first memory device 330 may be retrieved by the storage controller 310 and stored in the second memory device 320, and this operation may be referred to as a 'flush' operation. For example, the term "flush" may refer to the process of retrieving data and/or other information from first memory device 330 and storing the retrieved data and/or other information in the second memory device 320. As discussed in more detail below, the flush operation may be initiated by a flush command given by the storage controller 310.

The storage controller 310 may control operations of the storage device 300.

In some embodiments, the storage controller 310 may control operations of the first memory device 330 and the second memory device 320 based on requests REQ and data TDAT corresponding to the requests REQ provided by the host device 200.

For example, the storage controller 310 may control the first memory device 330 to temporarily store data provided from the host device 200 in the first memory device 330 based on requests REQ and data TDAT. The storage controller 310 may control the first memory device 330 and the second memory device 320 to flush data stored in the first memory device 330 based on the requests REQ and data TDAT. Thus, the data stored in the first memory device 330 may be provided to and stored in the second memory device 320.

For convenience of describing, data provided by the host device 200 to the storage device 300 is referred to as 'transmission data TDAT', data provided to the first memory device 330 to be temporarily stored in the first memory device 330 functioning as the buffer memory is referred to as 'first data DAT1', and data provided to the second memory device 320 to be stored in the second memory device 320 by flushing the first data DAT1 is referred to as 'second data DAT2'.

In some embodiments, the transmission data TDAT may be at least one of the plurality of unit time interval data, the first data DAT1 may be at least one of the transmission data TDAT, and the second data DAT2 may be at least one of the first data DAT1.

In some embodiments, the storage controller 310 may provide one of first and second flush commands to the first memory device 330 to control an amount of the second data DAT2. The storage controller 310 may further include a shock sensor 340 to sense a magnitude of an external shock applied to the storage device 300, and may output the sensed magnitude as a shock measurement value. The storage controller 310 may provide one of the first and second flush commands to the first memory device 330 based on a shock measurement value output by the shock sensor 340.

In some embodiments, the storage controller 310 may issue the first flush command to flush only at least one of the data stored in the first memory device 330, and issue the second flush command to additionally flush at least one different from data flushed in response to the first flush command among data stored in the first memory device 330. For example, when the shock measurement value is less than or equal to a shock reference value, the storage controller 310 may provide the first flush command to the first memory device 330 to flush only at least one of the first data DAT1 to the second memory device 320. When the shock measurement value is greater than the shock reference value, the storage controller 310 may provide the second flush command to the first memory device 330 to additionally flush at least one different from data flushed in response to the first flush command to the second memory device 320. The shock reference value may be a predetermined value that is stored in the storage device 300.

In some embodiments, the storage controller 310 may provide a third flush command to the second memory device 320 to flush all of the first data DAT1 to the second memory device 320 regardless of the shock measurement value.

The second memory device 320 may store the flushed data among the first data DAT1 as the second data DAT2. In this case, the storage controller 310 may include firmware 312, the firmware 312 may generate one of the first flush command, the second flush command, and the third flush command, and the storage controller 310 may control the first memory device 330 and the second memory device 320 based on an operation of the firmware 312.

In some embodiments, each of the plurality of nonvolatile memories 320a, 320b, and 320c may include a NAND flash memory. In some embodiments, each of the plurality of nonvolatile memories 320a, 320b, and 320c may include an electrically erasable programmable read-only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

In some embodiments, the first memory device 330 may include a volatile memory such as a static random access memory (SRAM), a dynamic random access memory (DRAM), or the like.

In some embodiments, the storage device 300 may be a universal flash storage (UFS). In some embodiments, the storage device 300 may be a solid state drive (SSD), a multimedia card (MMC), or an embedded MMC (eMMC). In some embodiments, the storage device may be a secure digital (SD) card, a micro SD card, a memory stick, a chip card, a universal serial bus (USB) card, a smart card, and a compact flash (CF) card.

In some embodiments, the storage device 300 may be connected to the host device 200 through a block accessible interface including a bus such as a serial advanced technology attachment (SATA) bus, a small computer small interface (SCSI) bus, a nonvolatile memory express (NVMe) bus and a serial attached SCSI (SAS) bus, and may be accessed by the host device 200 in units of blocks through the block accessible interface.

In some embodiments, the storage system 100 may be any computing system, such as, for example, an in-vehicle computer. In some embodiments, the storage system 100 may be any mobile system including a mobile phone, a smart phone, a tablet personal computer (PC), a laptop computer, a personal digital assistant (PDA), a portable multimedia player (PMP), a digital camera, a camcorder, a navigation device, etc.

According to the above-described configuration, the storage device according to example embodiments may reduce the number of programs and an amount of data to be programmed associated with the second memory device. Accordingly, a lifetime of the second memory device including a plurality of nonvolatile memories may be effectively increased.

FIG. 2 is a diagram for describing an autonomous vehicle including the storage device in FIG. 1.

Referring to FIGS. 1 and 2, an autonomous vehicle 110 may include the storage system 100 described above with reference to FIG. 1.

In some embodiments, an electronic device 113 may be installed inside the autonomous vehicle 110, and the storage system 100 may be included in the electronic device 113. In this case, the electronic device 113 may receive at least one of a plurality of unit time interval data generated from a plurality of sensors 201, 202, and 203 included in the autonomous vehicle 110, and may store the at least one of the plurality of unit time interval data in the storage system 100.

In some embodiments, the electronic device 113 may use a camera sensor, a radar sensor, or a lidar sensor among the plurality of sensors 201, 202, and 203 to detect a road 111 including a fixed pattern or a moving vehicle 117. In some embodiments, the electronic device 113 may detect a moving person.

In some embodiments, the electronic device 113 may control operations of the autonomous vehicle by using a module installed in the autonomous vehicle 110 and communicate with another module installed in the autonomous vehicle 110 by using a predetermined network. The modules installed in the autonomous vehicle 110 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the modules being implemented by microprocessors or similar, they may be programmed using software (e.g., microcode) to perform various functions discussed herein and may optionally be driven by firmware and/or software. Alternatively, each module may be implemented by dedicated hardware, or as a combination of dedicated hardware to perform some functions and a processor (e.g., one or more programmed microprocessors and associated circuitry) to perform other functions. Further, the modules may be physically combined into more complex blocks, units and/or modules without departing from the scope of the inventive concepts.

A plurality of monitoring time intervals may be defined during a driving time (i.e., from a driving start time START OF DRIVING to a driving end time END OF DRIVING) of the autonomous vehicle 110. Since it is inefficient to store all of the plurality of unit time interval data generated while the autonomous vehicle 110 is driving in the storage device 300, only a portion of the plurality of unit time interval data may be stored in the storage device 300.

In some embodiments, the plurality of monitoring time intervals may include a first monitoring time interval MON_TPRD1, a second monitoring time interval MON_TPRD2, a third monitoring time interval MON_TPRD3, and an X-th monitoring time interval MON_TPRDX, where X is a natural number greater than or equal to two. The plurality of monitoring time intervals may be determined based on at least one of the driving time of the autonomous vehicle 110 and the plurality of sensor data SD1, SD2, and SDM. Detailed descriptions of the plurality of monitoring time intervals will be described with reference to FIGS. 13, 14, and 15.

All or a portion of the plurality of time interval data in each of the plurality of monitoring time intervals may be stored in the storage device 300.

In some embodiments, the first memory device 330 may buffer a plurality of unit time interval data that are received in each of a plurality of monitoring time intervals for an autonomous driving control. For example, the first memory device 330 may buffer at least one of the plurality of unit time interval data as the first data DAT1 in each of the plurality of monitoring time intervals. The second memory device 320 may store at least one of the plurality of unit time interval data. For example, the second memory device 320 may store flushed data among the first data DAT1 as the second data DAT2.

In some embodiments, the autonomous vehicle 110 may be a means of transportation such as a car, a bus, a truck, a train, a bicycle, a motorcycle, etc., having a communication function, a data processing function, and a transportation function.

In some embodiments, the autonomous vehicle 110 may communicate with a server and another electronic device through a predetermined network to transmit commands for controlling operations of another electronic device. In this case, the predetermined network may include a local area network (LAN), a wide area network (WAN), a value added network (VAN), a mobile radio communication network, a satellite communication network, and a combination thereof, and may include one or more of a wired communication network, a wireless communication network, and a mobile wireless communication network. The wireless communication network may include a wireless LAN (Wi-Fi), a Bluetooth, a Bluetooth low energy, a zigbee, a Wi-Fi Direct (WFD), an ultra wideband (UWB), an infrared data association (IrDA), a near field communication, etc.

Figure 3:
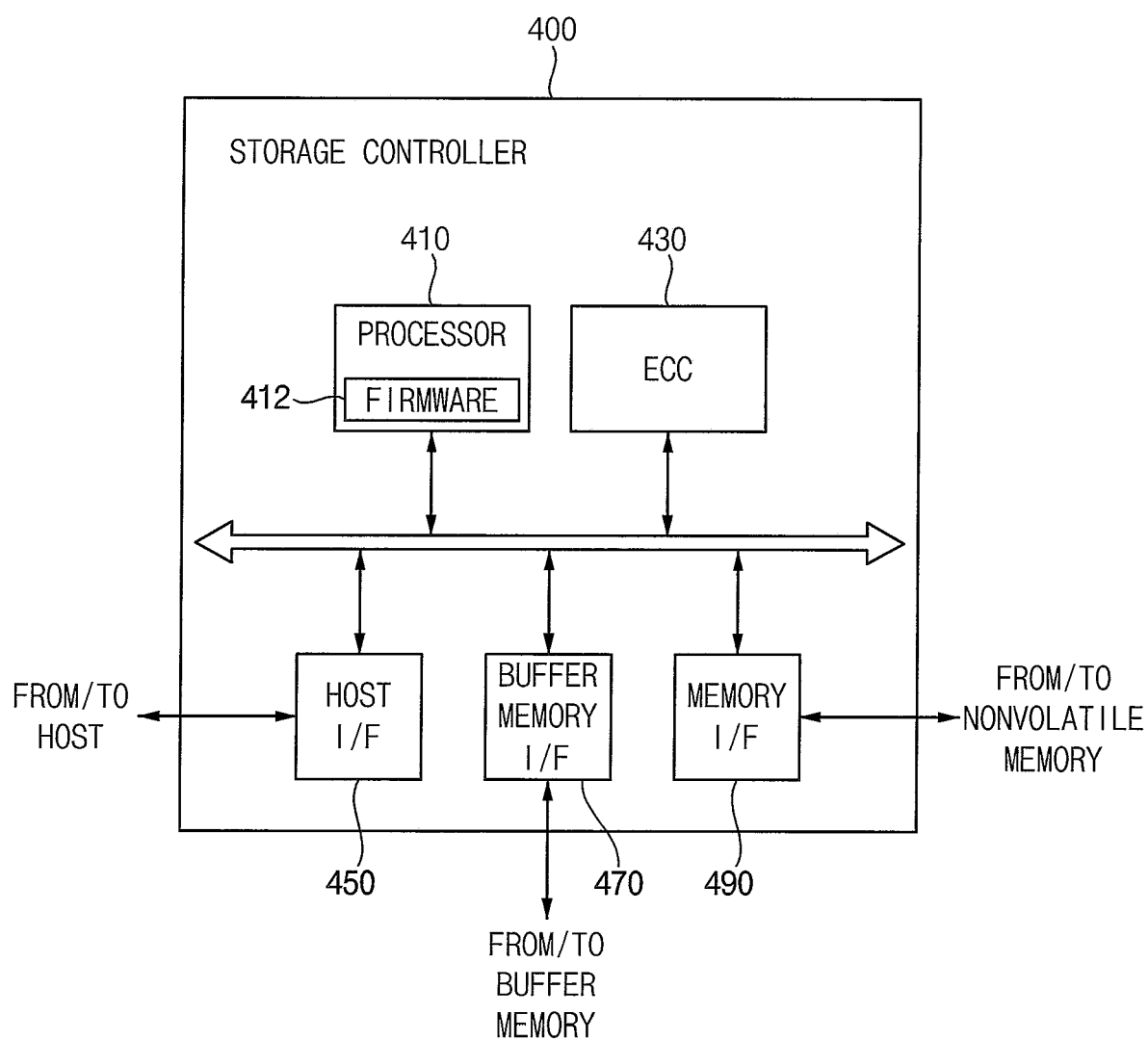
FIG. 3 is a block diagram illustrating an example of the storage controller in FIG. 1.

FIG. 3 is a block diagram illustrating an example of the storage controller in FIG. 1. For example, the storage controller 400 of FIG. 3 may an example of the storage controller 310 of FIG. 1.

Referring to FIG. 3, the storage controller 400 may include a processor 410, an error correction code (ECC) engine 430, a host interface (I/F) 450, a buffer memory interface (I/F) 470, and a memory interface (I/F) 490.

The processor 410 may control operations of the storage controller 400 in response to requests received from a host device (e.g., the host device 200 in FIG. 1) through the host interface 450. For example, the processor 410 may control operations of a storage device (e.g., 300 of FIG. 1), and may control various components included in the storage device by employing firmware 412 for driving the storage device. Firmware 412 of FIG. 3 may be an example of the firmware 312 of FIG. 1.

The ECC engine 430 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 450 may provide physical connections between the host device (e.g., host device 200 of FIG. 1) and the storage device (e.g., storage device 300 of FIG. 1). The host interface 450 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The buffer memory interface 470 may communicate with a buffer memory (e.g., the first memory device 330 in FIG. 1). The memory interface 490 may communicate with nonvolatile memories (e.g., the nonvolatile memories 320a, 320b, and 320c in FIG. 1)

In some embodiments, the host interface 450 may provide the transmission data TDAT described above with reference to FIGS. 1 and 2, and the buffer memory interface 470 may provide the first data DAT1 described above with reference to FIGS. 1 and 2, and the memory interface 490 may provide the second data DAT2 described above with reference to FIGS. 1 and 2.

In some embodiments, the buffer memory interface 470 may provide the first, the second, and the third flush commands described above with reference to FIGS. 1 and 2 to the first memory device 330, and the memory interface 490 may provide a program command to the second memory device 320.

Figure 4:
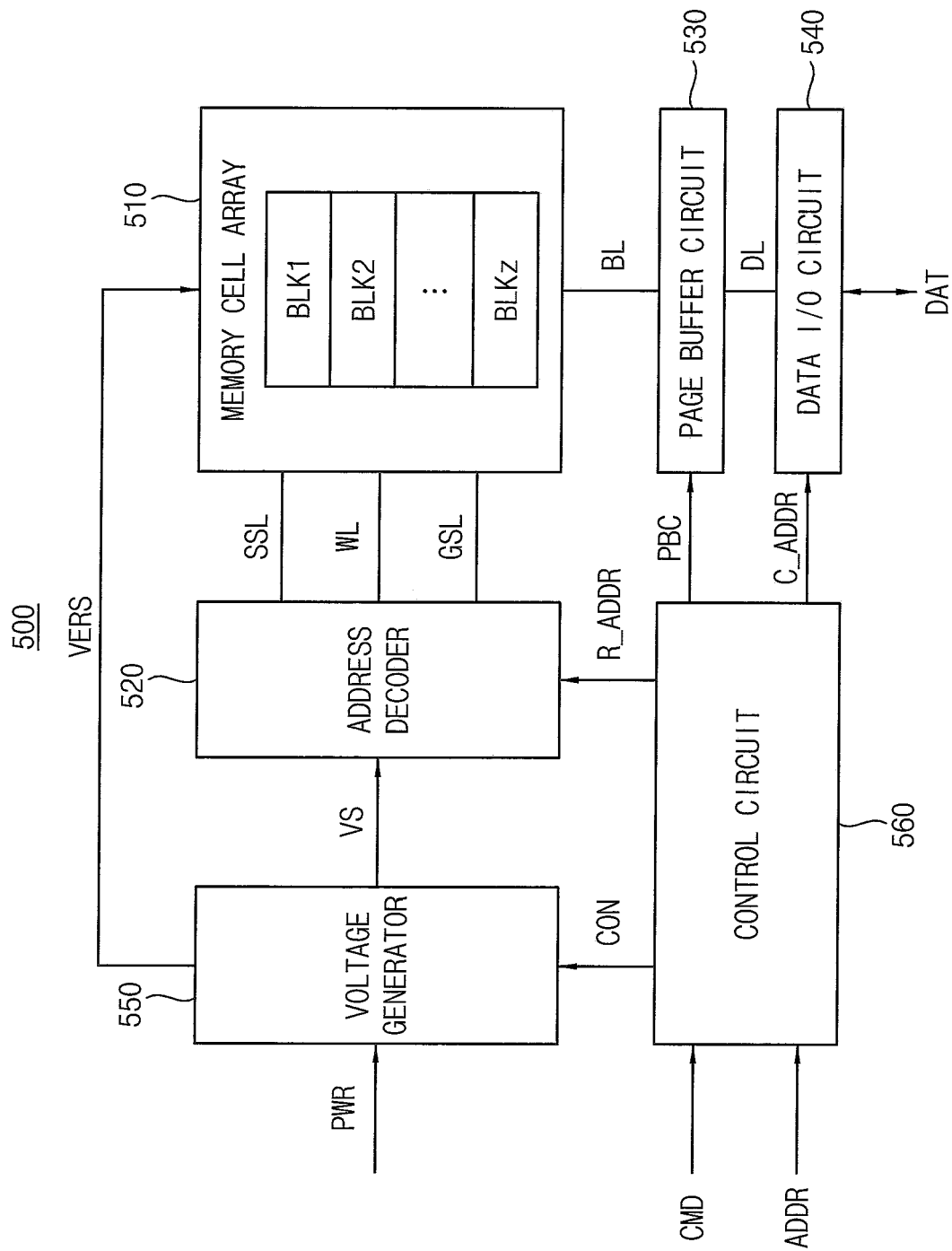
FIG. 4 is a block diagram illustrating an example of the nonvolatile memory in FIG. 1.

FIG. 4 is a block diagram illustrating an example of the nonvolatile memory in FIG. 1. For example, the nonvolatile memory 500 of FIG. 4 may be an example of any one of the plurality of nonvolatile memories (e.g., NVM1, NVM2, and NVM3) 320a, 320b, and 320c of FIG. 1.

Referring to FIG. 4, the nonvolatile memory 500 includes a memory cell array 510, an address decoder 520, a page buffer circuit 530, a data I/O circuit 540, a voltage generator 550, and a control circuit 560.

The memory cell array 510 is connected to the address decoder 520 via a plurality of string selection lines SSL, a plurality of wordlines WL, and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from an outside (e.g., from the storage controller 310 in FIG. 1), and controls erasure, programming, and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, may generate control signal PBC for controlling the page buffer circuit 530 based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL, and the plurality of ground selection lines GSL.

For example, in the data erase/write/read operations, the address decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON received from the control circuit 560. The voltages VS may be applied to the plurality of string selection lines SSL, the plurality of wordlines WL, and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block of the plurality of memory blocks BLK1, BLK2, . . . , BLKz) and may apply an erase permission voltage (e.g., a ground voltage) to all wordlines of the memory block or a portion of the wordlines of the memory block via the address decoder 520. In addition, during the erase verification operation, the voltage generator 550 may apply an erase verification voltage simultaneously to all wordlines of the memory block or sequentially to the wordlines of the memory block one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory according to example embodiments is described based on a NAND flash memory, the nonvolatile memory according to example embodiments may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 5:
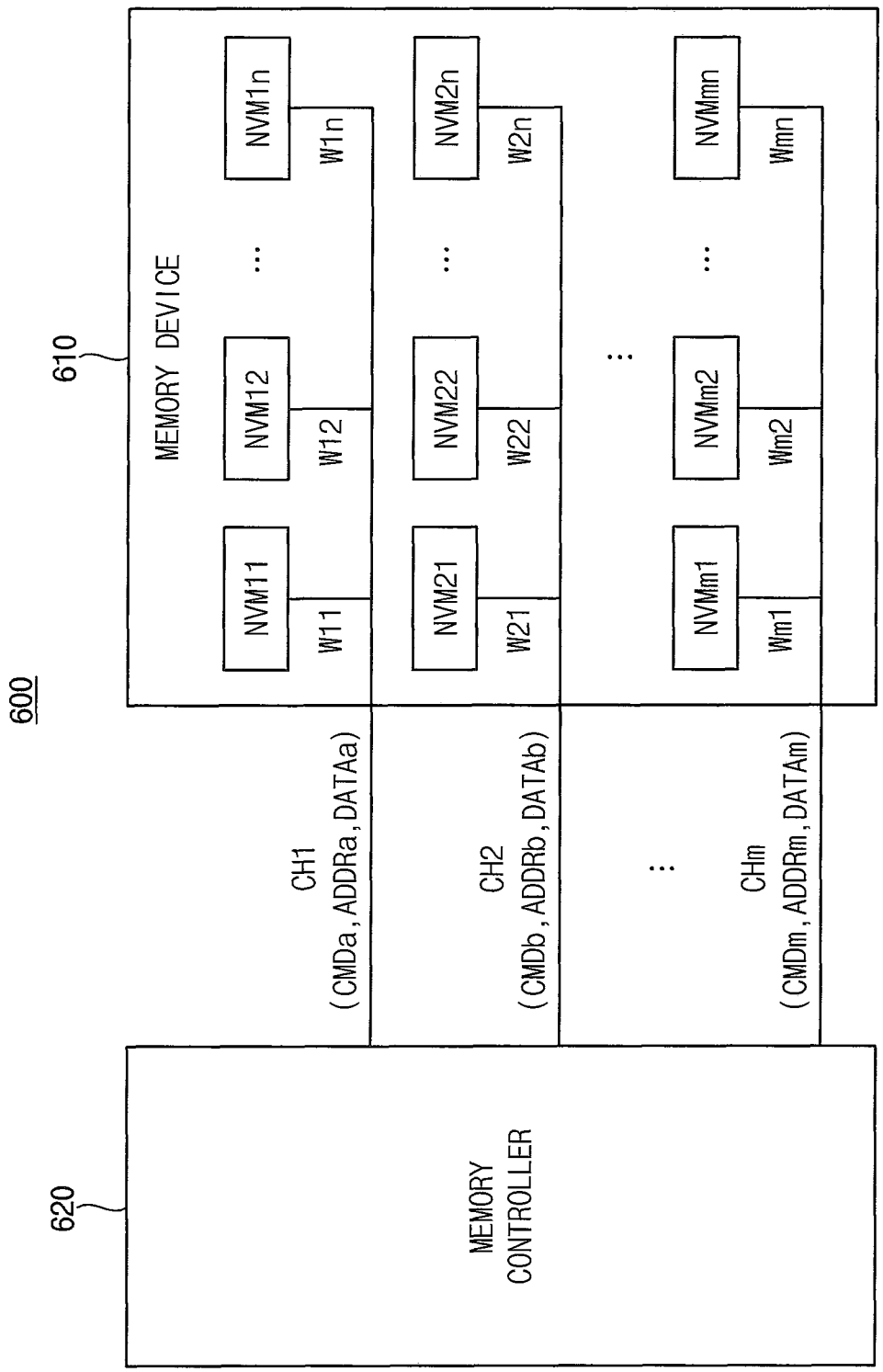
FIG. 5 is a block diagram illustrating a nonvolatile memory and a memory system included in the storage device in FIG. 1.

FIG. 5 is a block diagram illustrating a nonvolatile memory and a memory system included in the storage device in FIG. 1.

Referring to FIG. 5, a memory system 600 may include a memory device 610 and a memory controller 620. The memory system 600 may support a plurality of channels CH1, CH2, . . . , CHm, and the memory device 610 may be connected to the memory controller 620 through the plurality of channels CH1 to CHm. For example, the memory system 600 may be implemented as a storage device, such as a universal flash storage (UFS), a solid state drive (SSD), or the like.

The memory device 610 may include a plurality of nonvolatile memories NVM11, NVM12, . . . , NVM1$n$, NVM21, NVM22, . . . , NVM2$n$, NVMm1, NVMm2, . . . , NVMmn. For example, the nonvolatile memories NVM11 to NVMmn may correspond to the nonvolatile memories 320$a$, 320$b$ and 320$c$ in FIG. 1. Each of the nonvolatile memories NVM11 to NVMmn may be connected to one of the plurality of channels CH1 to CHm through a way corresponding thereto. For instance, the nonvolatile memories NVM11 to NVM1$n$ may be respectively connected to the first channel CH1 through ways W11, W12, . . . , W1$n$, the nonvolatile memories NVM21 to NVM2$n$ may be respectively connected to the second channel CH2 through ways W21, W22, . . . , W2$n$, and the nonvolatile memories NVMm1 to NVMmn may be respectively connected to the m-th channel CHm through ways Wm1, Wm2, . . . , Wmn. In some example embodiments, each of the nonvolatile memories NVM11 to NVMmn may be implemented as an arbitrary memory unit that may operate according to an individual command from the memory controller 620. For example, each of the nonvolatile memories NVM11 to NVMmn may be implemented as a chip or a die, but example embodiments are not limited thereto.

The memory controller 620 may transmit and receive signals to and from the memory device 610 through the plurality of channels CH1 to CHm. For example, the memory controller 620 may correspond to the storage controller 310 in FIG. 1. For example, the memory controller 620 may transmit commands CMDa, CMDb, . . . , CMDm, addresses ADDRa, ADDRb, . . . , ADDRm, and data DATAa, DATAb, . . . , DATAm to the memory device 610 through the channels CH1 to CHm, respectively, or may receive the data DATAa to DATAm from the memory device 610.

The memory controller 620 may select one of the nonvolatile memories NVM11 to NVMmn, which are connected to the channels CH1 to CHm, by using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1$n$, which is connected to the first channel CH1. The memory controller 620 may transmit the command CMDa, the address ADDRa, and the data DATAa to the selected nonvolatile memory NVM11 through the first channel CH1 or may receive the data DATAa from the selected nonvolatile memory NVM11.

The memory controller 620 may transmit and receive signals to and from the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1$n$.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

Although FIG. 5 illustrates an example where the memory device 610 communicates with the memory controller 620 through m channels and includes n nonvolatile memories corresponding to each of the channels, the number of channels and the number of nonvolatile memories connected to one channel may be variously changed according to example embodiments.

Figure 6:
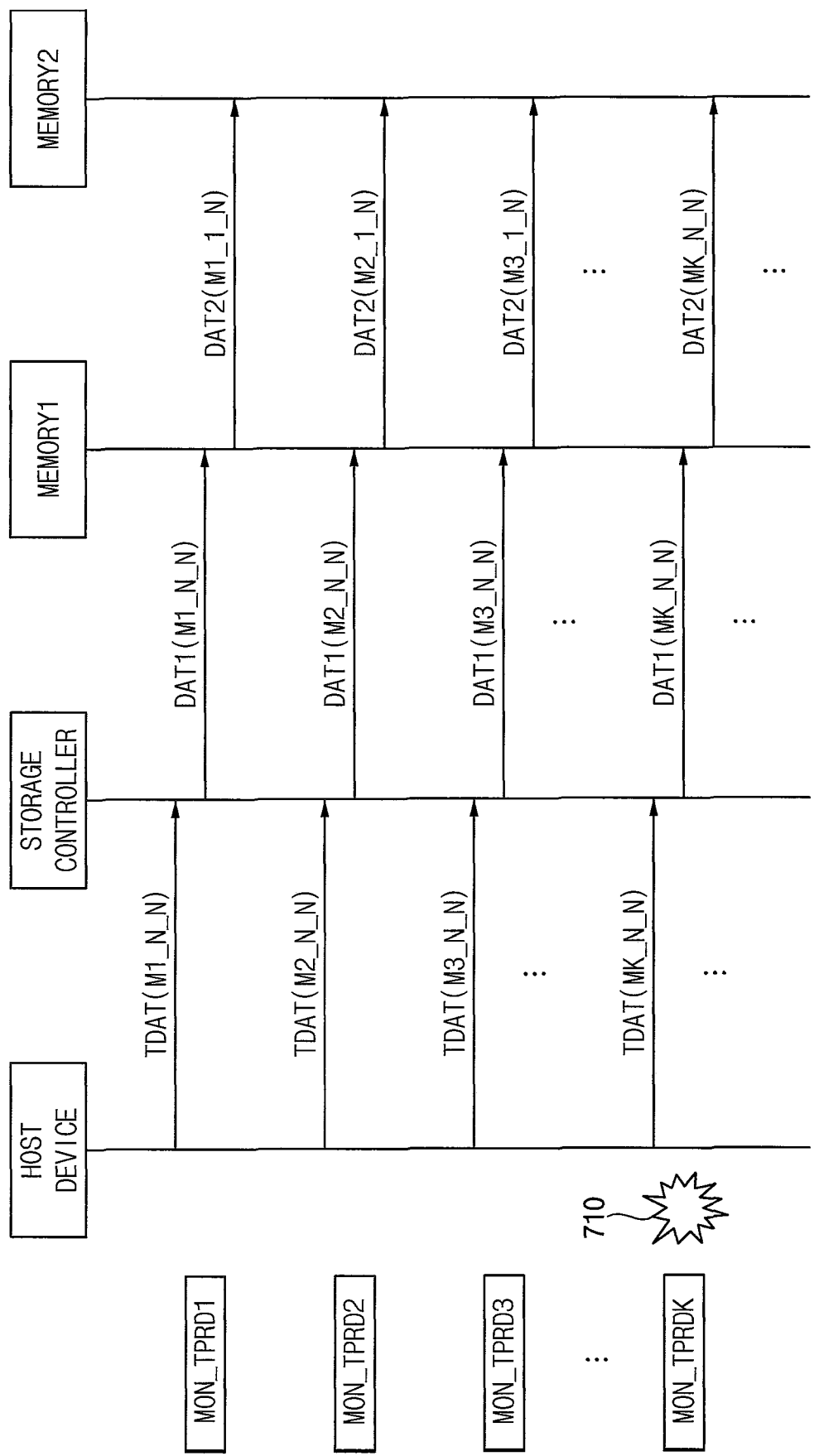
FIGS. 6, 7, and 8 are diagrams for describing operations of the host device, the storage controller, the first memory device and the second memory device in FIG. 1.
Figure 7:
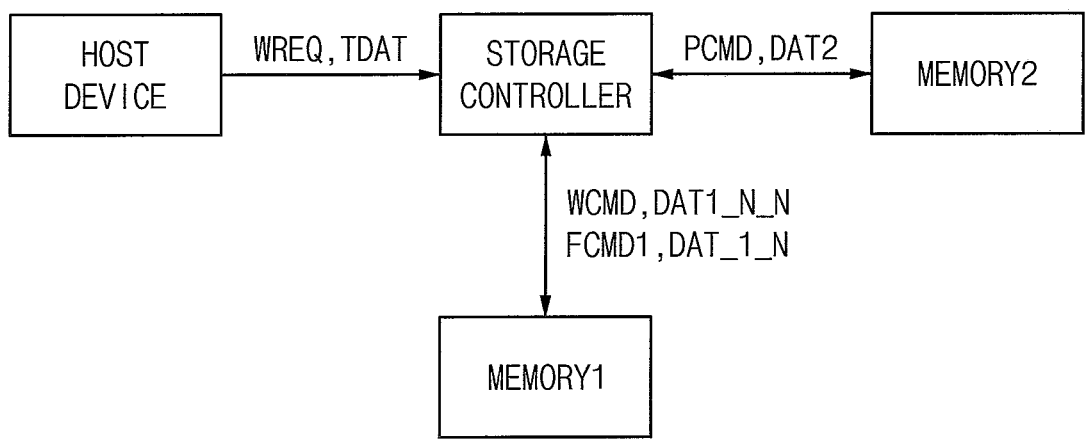
Figure 8:
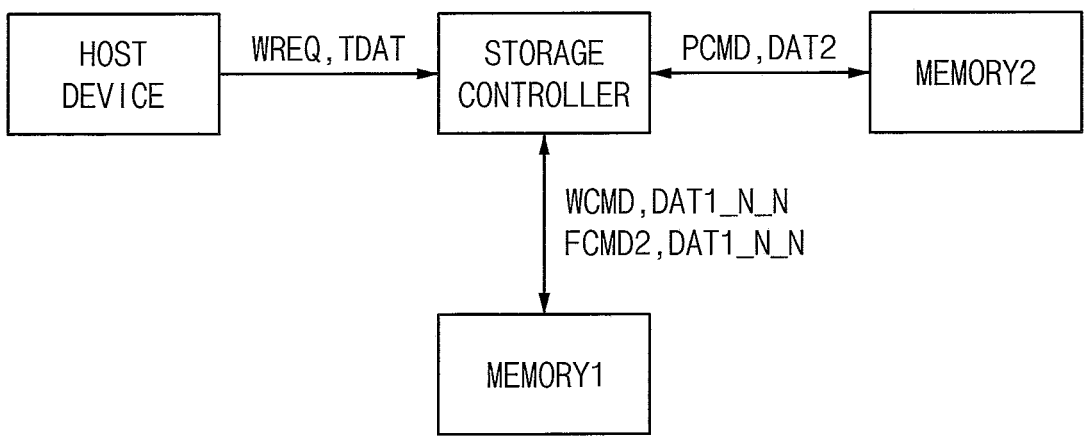

FIGS. 6, 7 and 8 are diagrams for describing operations of the host device, the storage controller, the first memory device, and the second memory device in FIG. 1.

In FIG. 6, a first monitoring time interval MON_TPRD1, a second monitoring time interval MON_TPRD2, a third monitoring time interval MON_TPRD3, and a K-th monitoring time interval MON_TPRDK are illustrated. The first to third monitoring time intervals MON_TPRD1, MON_TPRD2, and MON_TPRD3 may correspond to the first to third monitoring time intervals described above with reference to FIG. 2, and the K-th monitoring time interval MON_TPRDK may correspond to a monitoring time interval at any time point between the third monitoring time interval MON_TPRD3 and the X-th monitoring time interval MON_TPRDX described above with reference to FIG. 2.

A host device, a storage controller, a first memory device MEMORY1, and a second memory device MEMORY2 of FIG. 6 may correspond to the host device 200, the storage controller 310, the first memory device 330, and the second memory device 320, respectively, of FIG. 1.

In the first, the second, the third, and the K-th monitoring time intervals MON_TPRD1, MON_TPRD2, MON_TPRD3, and MON_TPRDK, the host device 200 may provide all of a plurality of unit time interval data (e.g., plurality of sensor data SD1, SD2, and SDM described above with reference to FIG. 1) as transmission data TDAT to the storage controller 310. However, example embodiments are not limited thereto. The host device 200 may provide only a portion of the plurality of unit time interval data as the transmission data TDAT to the storage controller 310.

In the first monitoring time interval MON_TPRD1, the storage controller 310 may receive the transmission data TDAT(M1_N_N), provide the transmission data TDAT (M1_N_N) as first data DAT1(M1_N_N) to the first memory device 330, and flush data DAT2(M1_1_N) temporarily stored in the first memory device 330 to the second memory device 320. In this case, the amount of data M1_1N to be flushed to the second memory device 320 may be 1/N of the amount of data M1 temporarily stored in the first memory device 330, where N is a natural number greater than or equal to two. Therefore, in the first monitoring time interval MON_TPRD1, the storage controller 310 may flush only first unit time interval data, which is a portion of the plurality of unit time interval data, from the first memory device 330 to the second memory device 320.

In the second monitoring time interval MON_TPRD2 and the third monitoring time interval MON_TPRD3, the portion of the plurality of unit time interval data may be stored in the first memory device 330 and the second memory device 320 in a similar manner to the first monitoring time interval MON_TPRD1. For example, in the second monitoring time interval MON_TPRD2, the storage controller 310 may receive the transmission data TDAT(M2_N_N), provide the transmission data TDAT(M2_N_N) as first data DAT1(M2_N_N) to the first memory device MEMORY1, and flush data DAT2(M2_1_N) temporarily stored in the first memory device MEMORY1 to the second memory device MEMORY2. In the third monitoring time interval MON_TPRD3, the storage controller 310 may receive the transmission data TDAT(M3_N_N), provide the transmission data TDAT(M3_N_N) as first data DAT1(M3_N_N) to the first memory device MEMORY1, and flush data DAT2 (M3_1_N) temporarily stored in the first memory device MEMORY1 to the second memory device MEMORY2.

In the K-th monitoring time interval MON_TPRDK, unlike in the first to third monitoring time intervals MON_TPRD1 to MON_TPRD3, an external shock 710 may be applied to a storage system including the host device 200, the storage controller 310, the first memory device MEMORY1, and the second memory device MEMORY2. The storage controller 310 may compare a shock measurement value representing a magnitude of the external shock 710 with a shock reference value. Hereinafter, it is assumed that the shock measurement value according to the external shock 710 is greater than the shock reference value.

In the K-th monitoring time interval MON_TPRDK, the storage controller 310 may receive the transmission data TDAT(MK_N_N), provide the transmission data TDAT (MK_N_N) as the first data DAT1(MK_N_N) to the first memory device MEMORY1, and flush data DAT2 (MK_N_N) temporarily stored in the first memory device MEMORY1 to the second memory device MEMORY2. In this case, the amount of data MK_N_N to be flushed to the second memory device MEMORY2 may be substantially the same as the amount of data MK temporarily stored in the first memory device MEMORY1. However, example embodiments are not limited thereto. In some embodiments, the amount of data to be flushed to the second memory device MEMORY2 may be less than the amount of data MK temporarily stored in the first memory device MEMORY1 and may be greater than the first unit time interval data. Therefore, in the K-th monitoring time interval MON_T-PRDK, the storage controller 310 additionally may additionally flush not only the first unit time interval data but also second unit time interval data that are another portion of the plurality of unit time interval data and different from the first unit time interval data to the second memory device MEMORY2.

In some embodiments, the storage controller 310 may compare the shock measurement value with the shock reference value when the external shock 710 is applied to the storage system. When the shock measurement value is less than or equal to the shock reference value, the storage controller 310 may flush only the first unit time interval data, which is a portion of the plurality of unit time interval data, from the first memory device MEMORY1 to the second memory device MEMORY2. When the shock measurement value is greater than the shock reference value, the storage controller 310 may flush the first unit time interval data and the second unit time interval data of the plurality of unit time interval data, from the first memory device MEMORY1 to the second memory device MEMORY2.

According to the above configuration, when an external shock greater than the shock reference value is applied to the storage system, it is determined that a special situation has occurred in the autonomous vehicle, and the first unit time interval data and the second unit time interval data may be stored in the second memory device MEMORY2. When the external shock less than the shock reference value is applied to the storage system, it is determined that a special situation has not occurred in the autonomous vehicle, and only the first unit time interval data may be stored in the second memory device MEMORY2.

In FIG. 7, requests, commands, and data transferred among the host device 200, the storage controller 310, the first memory device MEMORY1, and the second memory device MEMORY2 are illustrated when the external shock less than the shock reference value is applied to the storage system. The requests, the commands, and the data in FIG. 7 may correspond to the first, second, and the third monitoring time intervals MON_TPRD1, MON_TPRD2, and MON_T-PRD3 described above with reference to FIG. 6.

Referring to FIG. 7, the host device 200 may provide a write request WREQ and transmission data TDAT corresponding to the write request WREQ to the storage controller 310. The storage controller 310 may provide a write command WCMD and first data DAT1_N_N corresponding to the write command WCMD to the first memory device MEMORY1, and the first memory device MEMORY1 may temporarily store the first data DAT1_N_N. The first data DAT1_N_N corresponding to the write command WCMD may be the unit time interval data described above with reference to FIG. 6 (e.g., unit time interval data DAT1 (M1_N_N)).

The storage controller 310 may provide a first flush command FCMD1 to the first memory device MEMORY1 to retrieve only a portion of the first data DAT1 corresponding to the first flush command FCMD1. The retrieved data DAT_1_N may be the first unit time interval data described above with reference to FIG. 6. The storage controller 310 may provide a program command PCMD and second data DAT2 corresponding to the program command PCMD to the second memory device MEMORY2. The second data DAT2 may be the first unit time interval data described above with reference to FIG. 6 (e.g., first unit time interval data DAT2 (M1_1_N)).

In FIG. 8, requests, commands, and data transferred among the host device 200, the storage controller 310, the first memory device MEMORY1, and the second memory device MEMORY2 are illustrated when the external shock greater than the shock reference value is applied to the storage system. The request, the commands, and the data in FIG. 8 may correspond to the K-th monitoring time interval MON_TPRDK described above with reference to FIG. 6.

Referring to FIG. 8, the host device 200 may provide a write request WREQ and transmission data TDAT corresponding to the write request WREQ to the storage controller 310. The storage controller 310 may provide a write command WCMD and first data DAT1_N_N corresponding to the write command WCMD to the first memory device MEMORY1, and the first memory device MEMORY1 may temporarily store the first data DAT1_N_N.

The storage controller 310 may provide a second flush command FCMD2 to the first memory device MEMORY1 to retrieve not only the data DAT_1_N retrieved in response to the first flush command FCMD1 but also additional data (i.e., DAT1_N_N). The retrieved data DAT1_N_N may be the first unit time interval data and the second unit time interval data described above with reference to FIG. 6. The storage controller 310 may provide a program command PCMD and second data DAT2 corresponding to the program command PCMD to the second memory device MEMORY2. The second data DAT2 may be the first unit time interval data and the second unit time interval data described above with reference to FIG. 6 (e.g., first unit time interval data DAT2(M1_1_N) and second unit time interval data DAT2(M2_1_N)).

FIGS. 9, 10, 11, and 12 are diagrams for describing second data flushed from the first memory device to the second memory device in FIG. 1. A first memory device MEMORY1 and a second memory device MEMORY2 of FIGS. 9-12 may correspond to the the first memory device 330 and the second memory device 320, respectively, of FIG. 1.

In FIGS. 9, 10, 11 and 12, first, second, third, and K-th monitoring time intervals MON_TPRD1, MON_TPRD2, MON_TPRD3, and MON_TPRDK are the same as in FIGS. 6, 7, and 8. That is, the first, the second, and the third monitoring time intervals MON_TPRD1, MON_TPRD2, and MON_TPRD3 may be a case in which an external shock less than or equal to a shock reference value is applied to a storage system. The K-th monitoring time interval MON_T-PRDK may be a case in which the external shock greater than the shock reference value is applied to the storage system.

Each block (e.g., M1, M1_1_N, M2, M2_1_N, M3, M3_1_N, M(K−2), M(K−2)_1_N, M(K−1), M(K−1)_1_N, MK, MK_N_N) corresponding to a first memory device MEMORY1 and a second memory device MEMORY2 may represent all or a portion of a plurality of unit time interval data generated and provided corresponding to one of a plurality of monitoring time intervals. For example, the 'MK' block or the 'MK_1_N' block may represent all or a portion of the plurality of unit time interval data generated corresponding to the K-th monitoring time interval.

Figure 9:
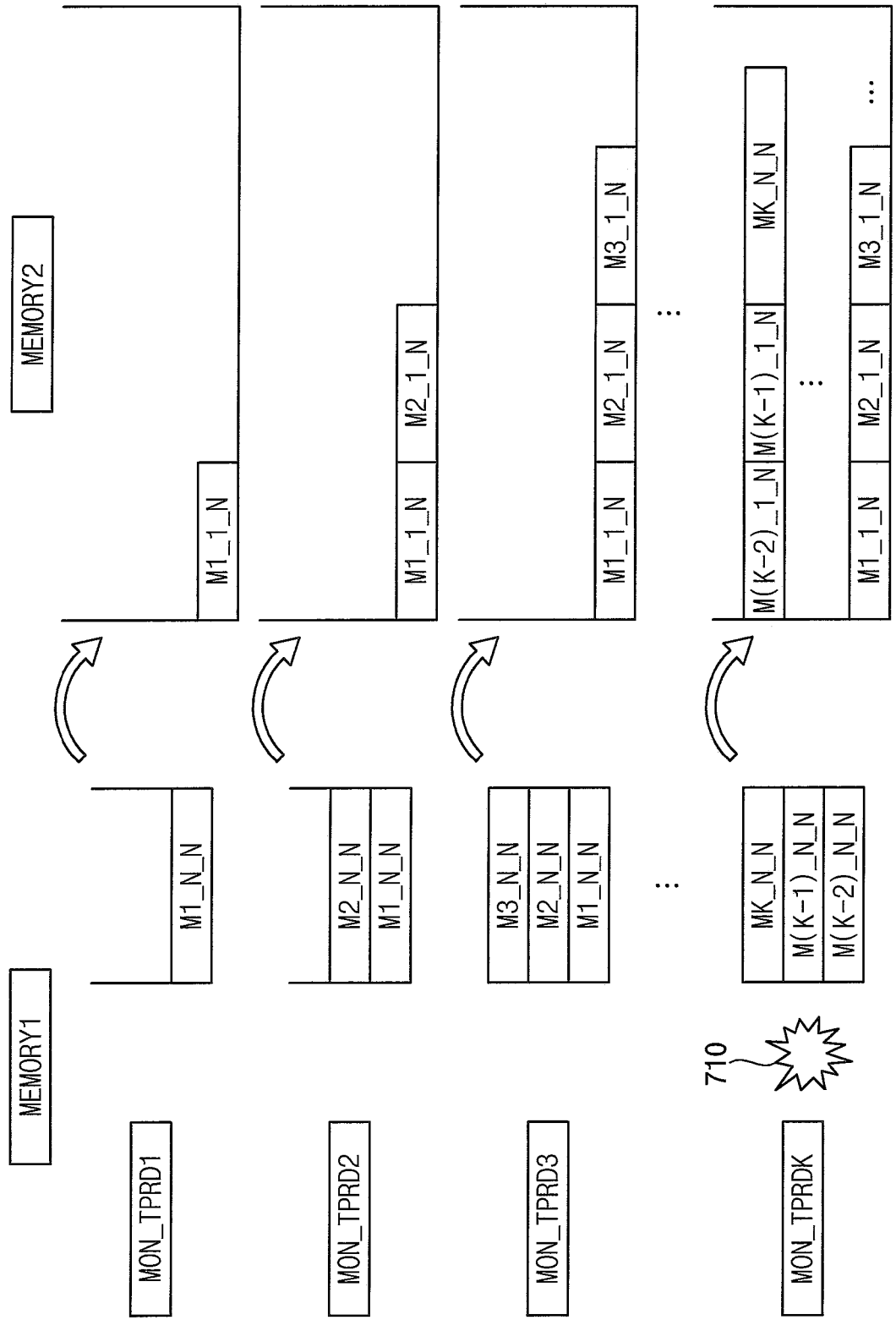
FIGS. 9, 10, 11, and 12 are diagrams for describing second data flushed from the first memory device to the second memory device in FIG. 1.

Referring to FIG. 9, in the first, second, and third monitoring time intervals MON_TPRD1, MON_TPRD2, and MON_TPRD3, only a portion (e.g., M1_1_N, M2_1_N, and M3_1_N) of data (e.g., M1, M2, and M3) stored in the first memory device MEMORY1 may be flushed to the second memory device MEMORY2 in response to a first flush command.

In example embodiments, in monitoring time intervals K−1 and K−2 (not illustrated), only a portion (e.g., M(K−1)_1_N and M(K−2)_1_N)) of data (e.g., M(K−1) and M(K−2)) stored in the first memory device MEMORY1 may be flushed to the second memory device MEMORY2 in response to the first flush command.

Figure 10:
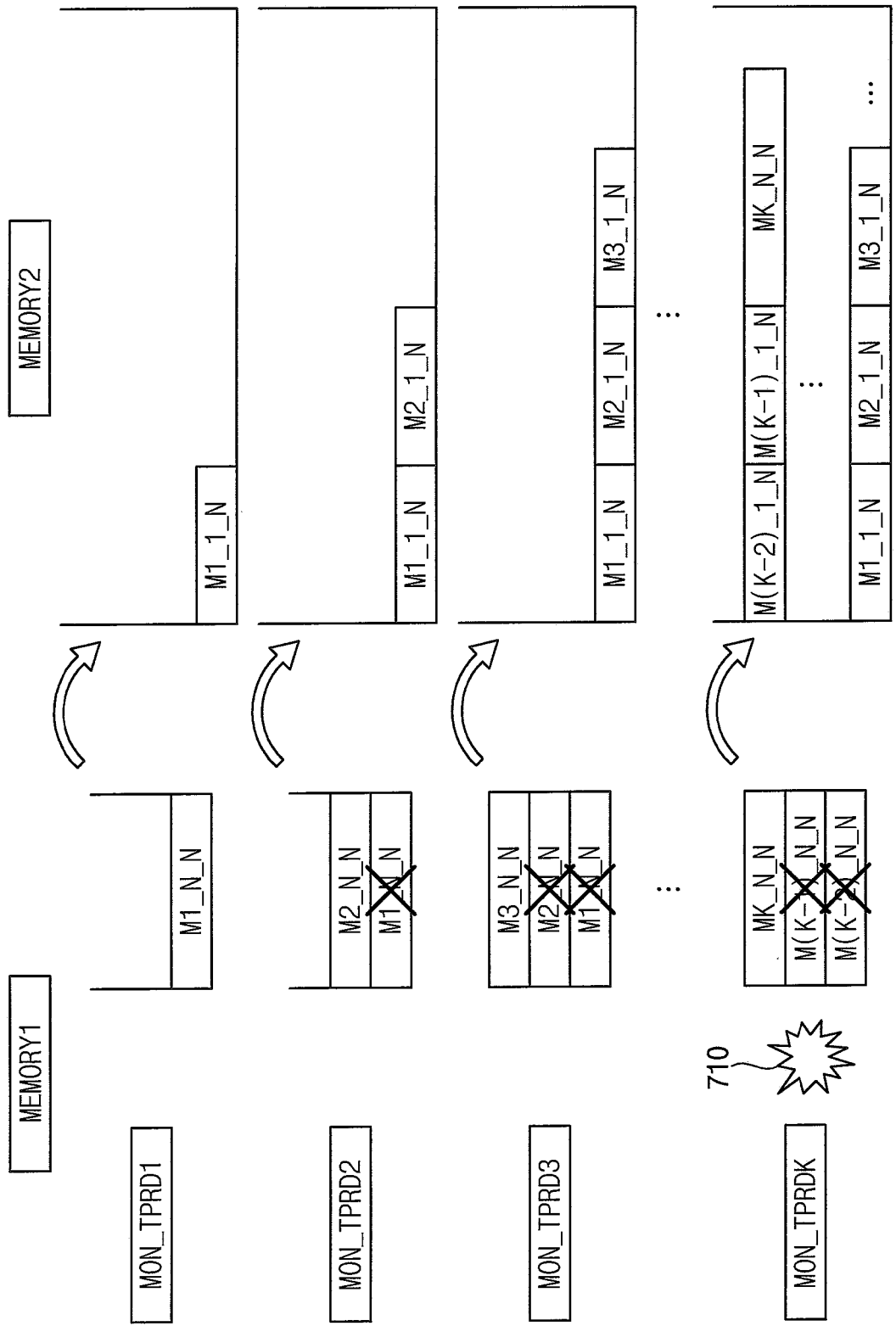

However, in the K-th monitoring time interval MON_T-PRDK, among the data (e.g., MK) stored in the first memory device MEMORY1, a portion (e.g., MK_N_N) different from the data flushed in response to the first flush command may be additionally flushed to the second memory device MEMORY2. In this case, the first memory device MEMORY1 may perform a general buffering operation. The first memory device MEMORY1 may buffer data corresponding to each of the first, the second, the third and the K-th monitoring time intervals until the first memory device MEMORY1 is full. Referring to FIG. 10, in the first, second, and third monitoring time intervals MON_TPRD1, MON_TPRD2, and MON_TPRD3, only a portion (e.g., M1_1_N, M2_1_N, and M3_1_N) of data (e.g., M1, M2, and M3) stored in the first memory device MEMORY1 may be flushed to the second memory device MEMORY2 in response to a first flush command.

However, in the K-th monitoring time interval MON_T-PRDK, among the data (e.g., MK) stored in the first memory device MEMORY1, a portion (e.g., MK_N_N) different from the data flushed in response to the first flush command may be additionally flushed to the second memory device MEMORY2. In this case, the first memory device MEMORY1 may temporarily store only unit time interval data corresponding to each of the first, the second, the third, and the K-th monitoring time intervals MON_TPRD1, MON_TPRD2, MON_TPRD3, and MON_TPRDK and delete data corresponding to the previous monitoring time intervals.

For example, when the first memory device MEMORY1 buffers a plurality of sensor data generated in the second monitoring time interval MON_TPRD2 (e.g., data M2_N_N), the first memory device MEMORY1 may delete a plurality of sensor data generated in the first monitoring time interval MON_TPRD1 (e.g., data M1_N_N). When the first memory device MEMORY1 buffers a plurality of sensor data generated in the third monitoring time interval MON_TPRD3 (e.g., data M3_N_N), the first memory device MEMORY1 may delete a plurality of sensor data generated in the first and second monitoring time intervals MON_TPRD1 and MON_TPRD2 (e.g., data M1_N_N and M2_N_N). When the first memory device MEMORY1 buffers a plurality of sensor data generated in the K-th monitoring time interval MON_TPRDK (e.g., data MK_N_N), the first memory device MEMORY1 may delete a plurality of sensor data generated in the (K−1)-th monitoring time interval and a plurality of sensor data generated in the (K−2)-th monitoring time interval (e.g., data M(K−1)_N_N and M(K−2)_N_N).

Figure 11:
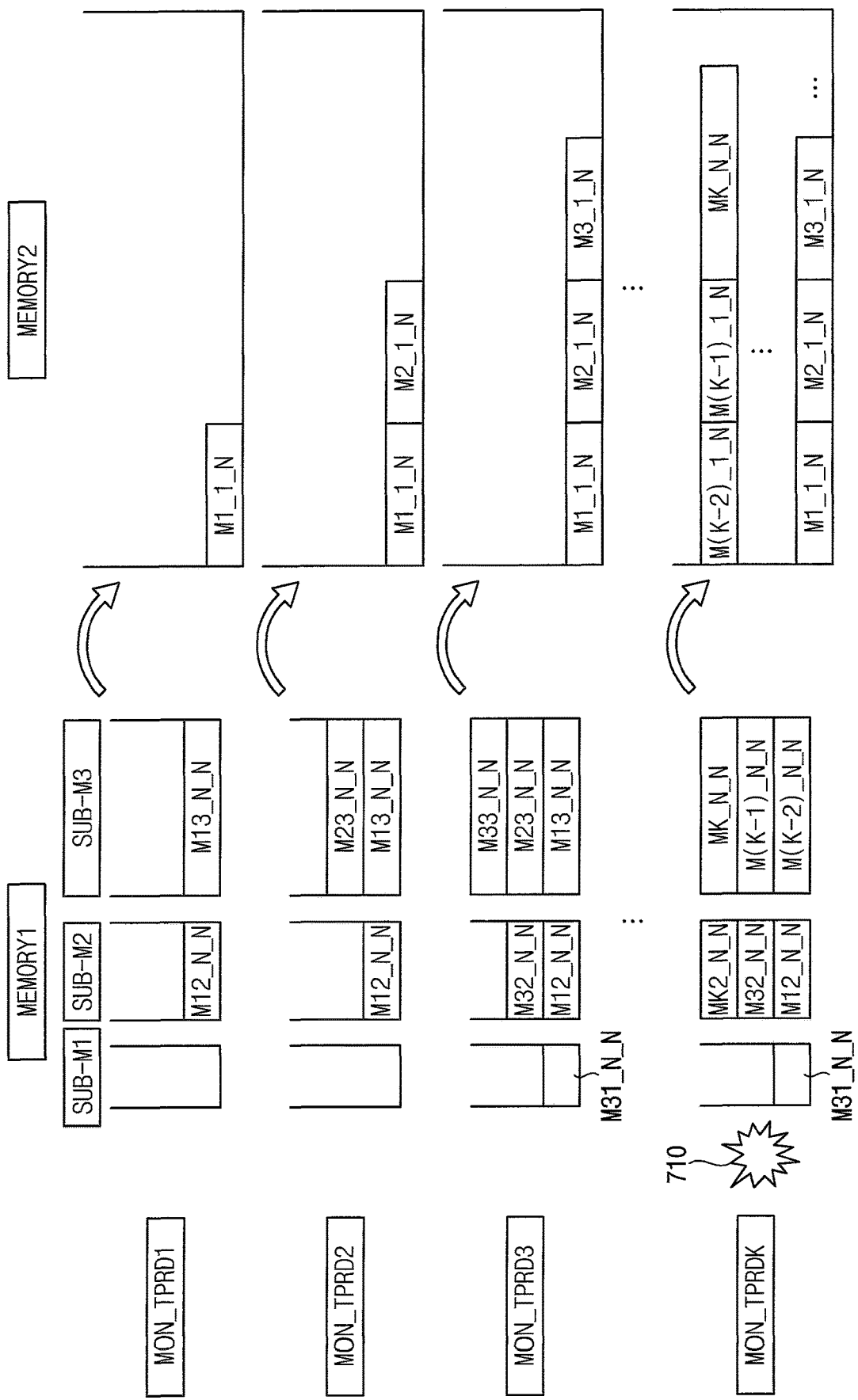

Referring to FIG. 11, the first memory device MEMORY1 may include a plurality of sub-memories SUB-M1, SUB-M2, and SUB-M3. Each of the first sub-memory SUB-M1, the second sub-memory SUB-M2, and the third sub-memory SUB-M3 among the plurality of sub-memories SUB-M1, SUB-M2, and SUB-M3 may have a capacity of a different size. Each of the first sub-memory SUB-M1, the second sub-memory SUB-M2, and the third sub-memory SUB-M3 may correspond to different kinds of sensor data. For example, sensor data SD1 generated by a first sensor among a plurality of sensors may be stored in the first sub-memory SUB-M1 (e.g., M31_N_N), sensor data SD2 generated by a second sensor among a plurality of sensors may be stored in the second sub-memory SUB-M2 (e.g., M12_N_N, M32_N_N, MK2_N_N), and sensor data SD3 generated by a third sensor among a plurality of sensors may be stored in the third sub-memory SUB-M3 (e.g., M13_N_N, M23_N_N, M33_N_N, M(K−2)_N_N, M(K−1)_N_N, MK_N_N).

Each of the plurality of sub-memories SUB-M1, SUB-M2, and SUB-M3 may perform operations similar to those of the first memory device 330 described above with reference to FIGS. 9 and 10.

Figure 12:
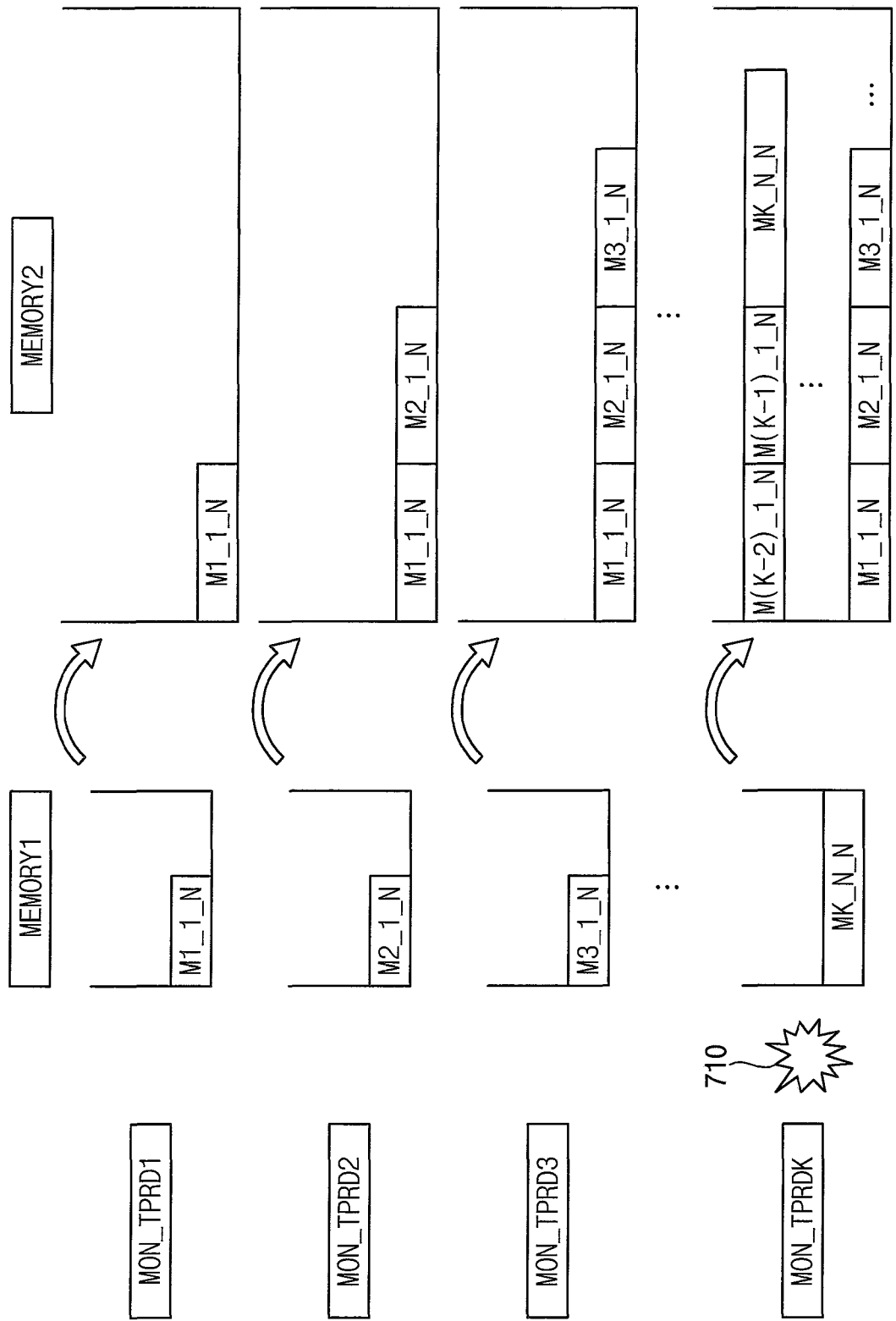

Referring to FIG. 12, unit time interval data provided by the host device to the storage device in the first, the second, the third, and the K-th monitoring time intervals MON_TPRD1, MON_TPRD2, MON_TPRD3, and MON_TPRDK may be data retrieved from the first memory device MEMORY1 in response to the first flush command described above with reference to FIGS. 9, 10, and 11 (e.g., the first unit time interval data). For example, when the storage system (e.g., the storage system 100 in FIG. 1) satisfies a first condition, the host device (e.g., host device 200 in FIG. 1) may provide only the first unit time interval data to be finally stored in the second memory device MEMORY2 among the unit time interval data to the storage device (e.g., the storage device 300 in FIG. 1).

In some embodiments, the first condition may be a case in which a capacity available for storing new data in the storage device (e.g., the storage device 300) included in the storage system decreases to less than a predetermined size. However, example embodiments are not limited thereto.

In some embodiments, the first condition may be a case in which a shock measurement value greater than a shock reference value applied to the storage device (e.g., the storage device 300) continues for more than a predetermined time. In this case, the shock measurement value may be measured based on the shock sensor 340 described above with reference to FIG. 1. When the first condition is not satisfied, the storage system may operate according to the operations described above with reference to FIGS. 9, 10, and 11.

In some embodiments, a third memory device (not illustrated) included in the host device (e.g., host device 200) may store the unit time interval data, and a host processor (e.g., host processor 210) may transmit only the first unit time interval data to the storage device (e.g., storage device 300) when the first condition is satisfied. In this case, the first memory device MEMORY1 may buffer the first unit time interval data among the plurality of unit time interval data, and the second memory device MEMORY2 may store the first unit time interval data. The storage controller (e.g., storage controller 310) may provide the first flush command to the first memory device MEMORY1 to flush the first unit time interval data to the second memory device MEMORY2.

Figure 13:
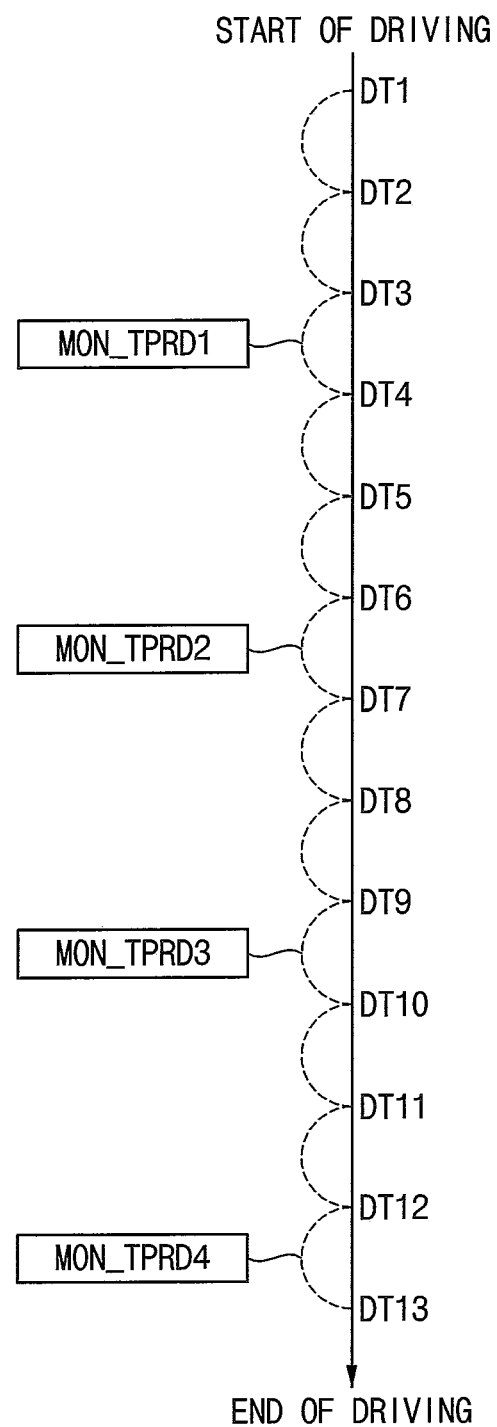
FIGS. 13, 14, and 15 are diagrams for describing a plurality of monitoring time intervals.
Figure 14:
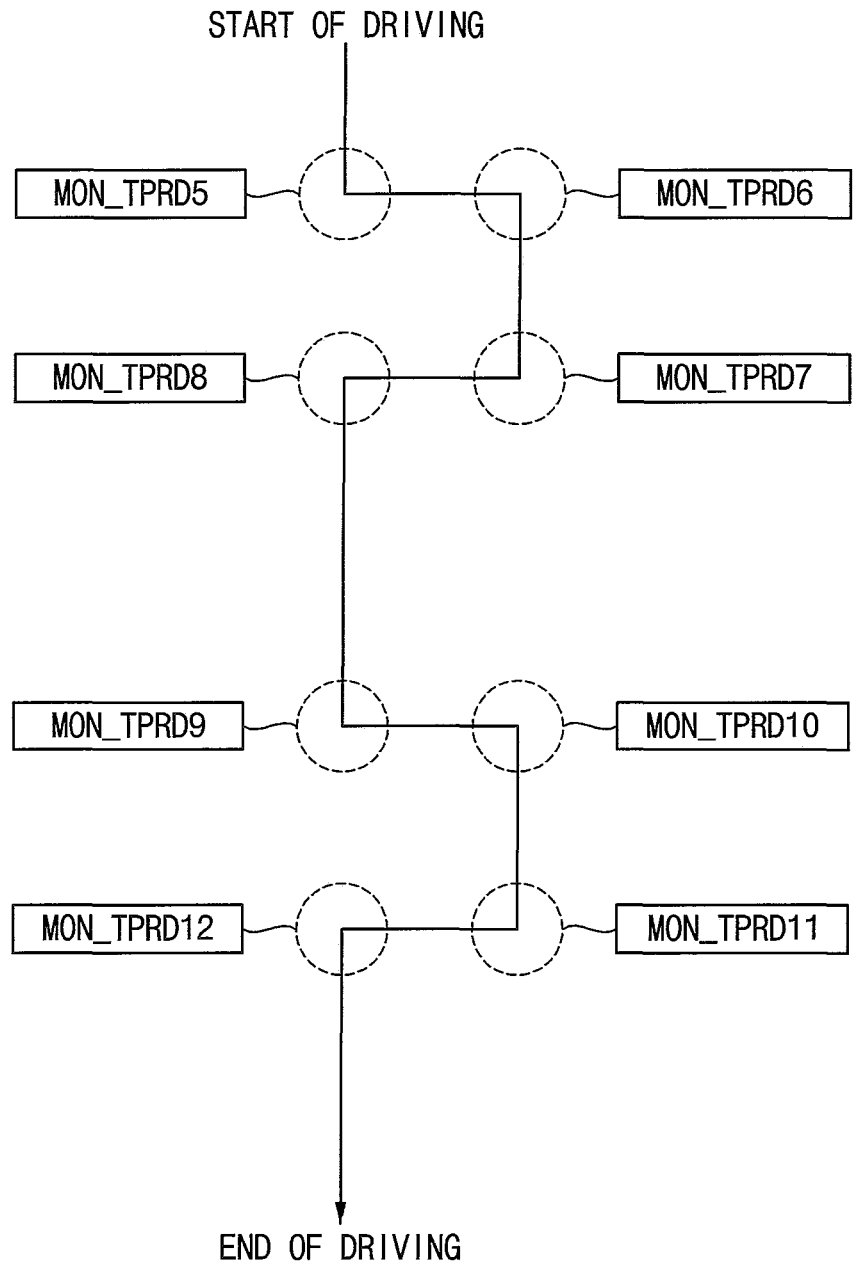
Figure 15:
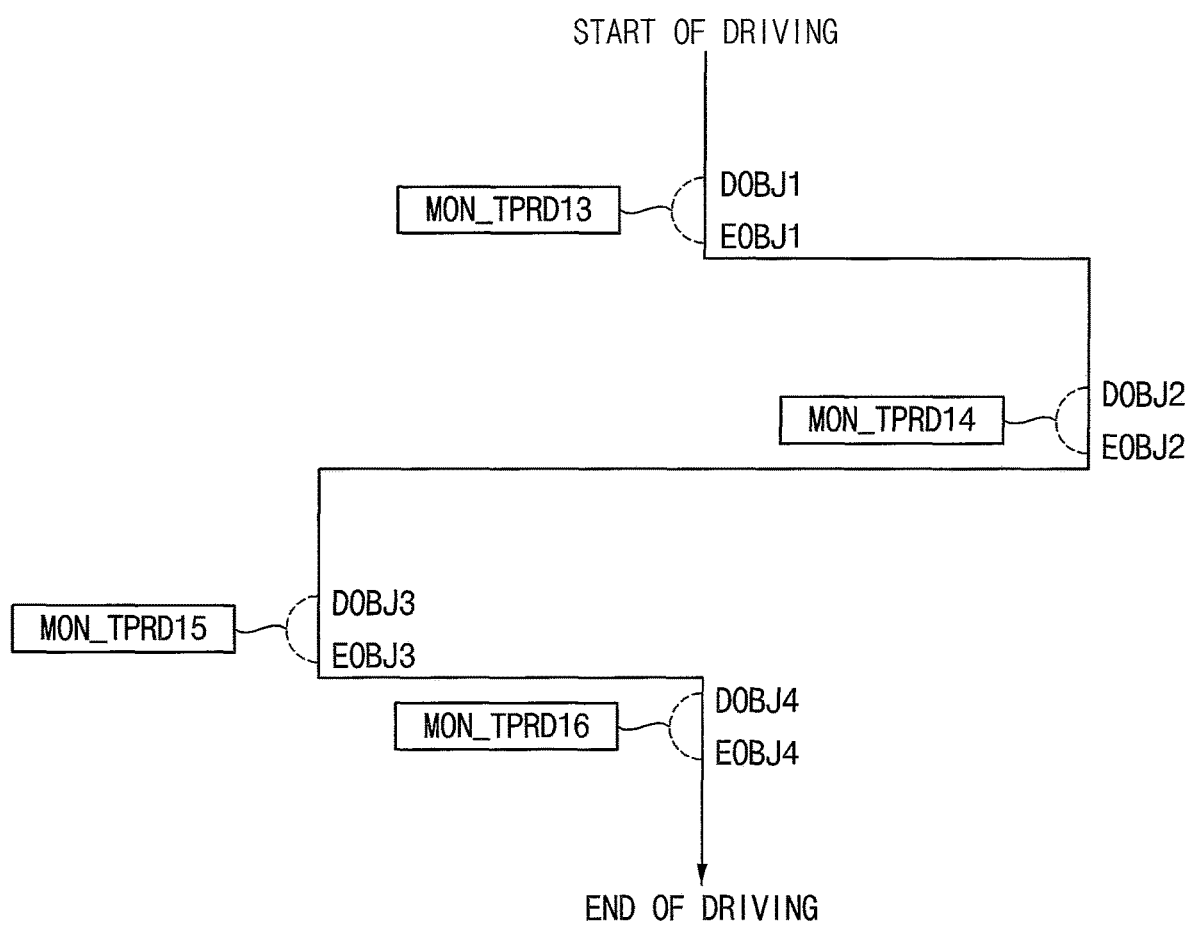

FIGS. 13, 14, and 15 are diagrams for describing a plurality of monitoring time intervals.

In FIGS. 13, 14, and 15, a plurality of monitoring time intervals may be defined during a driving time of an autonomous vehicle (i.e., from a driving start time (START OF DRIVING) to a driving end time (END OF DRIVING)). The plurality of monitoring time intervals may be determined based on at least one of the driving time of the autonomous vehicle and sensor data. FIG. 13 illustrates a case in which the plurality of monitoring time intervals are determined based on the driving time of the autonomous vehicle, and FIGS. 14 and 15 illustrate cases in which the plurality of monitoring time intervals are determined based on the sensor data.

Referring to FIG. 13, the driving time may include a plurality of driving time intervals (e.g., DT1 to DT2, DT2 to DT3, DT3 to DT4, . . . , DT12 to DT13). In this case, driving time intervals that are repeated every first cycle and selected from among the plurality of driving time intervals may be determined as the plurality of monitoring time intervals. For example, the driving time interval from DT3 to DT4 may be determined as the first monitoring time interval MON_TPRD1, and the driving time interval from DT6 to DT7 may be determined as the second monitoring time interval MON_TPRD2. The driving time interval from DT9 to DT10 may be determined as the third monitoring time interval MON_TPRD3, and the driving time interval from DT12 to DT13 may be determined as the second monitoring time interval MON_TPRD4.

Referring to FIG. 14, the plurality of monitoring time intervals may be determined based on an acceleration measurement value and an acceleration reference value of an acceleration sensor included in a plurality of sensors (e.g., the plurality of sensors 201, 202, and 203 in FIG. 1).

For example, a driving time interval including a time point at which the acceleration measurement value of the acceleration sensor is greater than the acceleration reference value may be determined as the monitoring time interval. For example, when each of a fifth to a twelfth monitoring time intervals MON_TPRD5, MON_TPRD6, MON_TPRD7, MON_TPRD8, MON_TPRD9, MON_TPRD10, MON_TPRD11, and MON_TPRD12 include a time point at which the acceleration measurement value is greater than the acceleration reference value, the fifth to the twelfth monitoring time intervals MON_TPRD5, MON_TPRD6, MON_TPRD7, MON_TPRD8, MON_TPRD9, MON_TPRD10, MON_TPRD11, and MON_TPRD12 may be determined as the plurality of monitoring time intervals.

Referring to FIG. 15, the plurality of monitoring time intervals may be determined based on a first object detected from images generated by a camera sensor (e.g., the camera sensor included in the plurality of sensors 201, 202, and 203 in FIG. 1).

In some embodiments, the first object may include a moving person or another approaching vehicle. For example, when the first object is detected in driving time intervals from DOBJ1 to EOBJ1, from DOBJ2 to EOBJ2, from DOBJ3 to EOBJ3, and from DOBJ4 to EOBJ4, each of the driving time intervals including the time point at which the first object is detected may be determined as the monitoring time interval. For example, when each of the thirteenth to sixteenth monitoring time intervals MON_TPRD13, MON_TPRD14, MON_TPRD15, and MON_TPRD16 include a time point at which the first object is detected, the thirteenth to sixteenth monitoring time intervals MON_TPRD13, MON_TPRD14, MON_TPRD15, and MON_TPRD16 may be determined as the plurality of monitoring time intervals.

Figure 16:
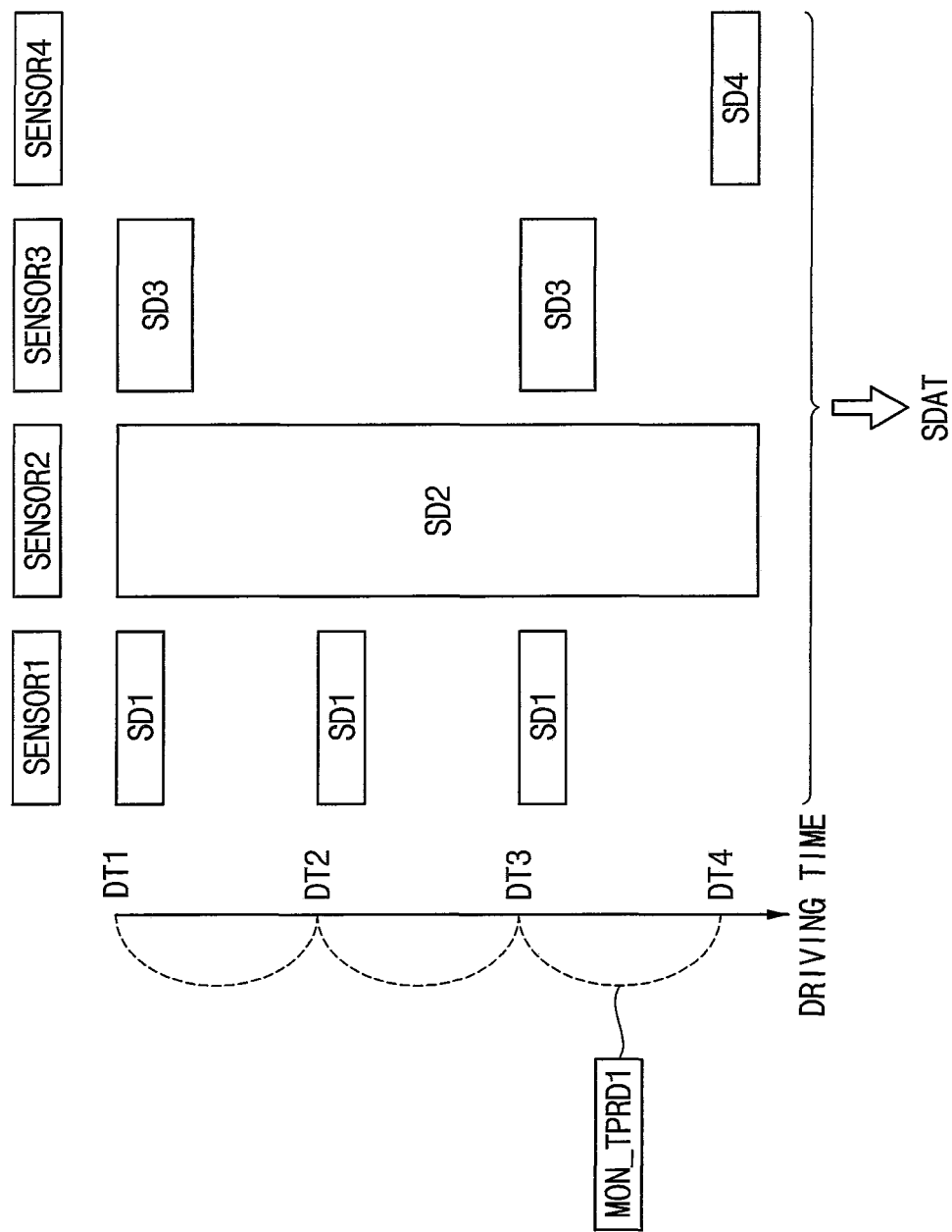
FIG. 16 is diagram for describing sensor data generated by the plurality of sensors in FIG. 1.

FIG. 16 is diagram for describing sensor data generated by the plurality of sensors in FIG. 1.

In FIG. 16, first to fourth sensors SENSOR1, SENSOR2, SENSOR3, and SENSOR4 are illustrated, and a first monitoring time interval MON_TPRD1 is illustrated. The first to fourth sensors SENSOR1, SENSOR2, SENSOR3, and SENSOR4 may correspond to the plurality of sensors 201, 202, and 203 of FIG. 1.

As described above with reference to FIG. 1, the first to the fourth sensors SENSOR1, SENSOR2, SENSOR3, and SENSOR4 may include at least one of an acceleration sensor, a geomagnetic sensor, a position sensor, a barometric pressure sensor, a temperature/humidity sensor, a proximity sensor, an infrared sensor, a gyroscope sensor, a camera sensor, a radar sensor, and a lidar sensor. The first monitoring time period MON_TPRD1 may correspond to the monitoring time interval determined according to the method described above with reference to FIG. 12, however, example embodiments are not limited thereto.

Referring to FIG. 16, the first sensor SENSOR1 discontinuously generates sensor data SD1 in each of DT1, DT2, and DT3. The second sensor SENSOR2 continuously generates sensor data SD2 from DT1 to DT4. The third sensor SENSOR3 discontinuously generates sensor data SD3 in each of DT1 and DT3. The fourth sensor SENSOR4 discontinuously generates sensor data SD4 in DT4.

The sensor data SD1, SD2, SD3, and SD4 generated by the first, the second, the third, and the fourth sensors SENSOR1, SENSOR2, SENSOR3, and SENSOR4 may be provided from a host device (e.g., host device 200) to a storage controller (e.g., storage controller 310) as sensor data SDAT corresponding to the first monitoring time interval MON_TPRD1.

In some embodiments, the sensor data SD1, SD2, SD3, and SD4 accumulated from the previous monitoring time interval until the next monitoring time interval arrives may be provided to the storage controller as the sensor data SDAT. However, example embodiments are not limited thereto.

Figure 17:
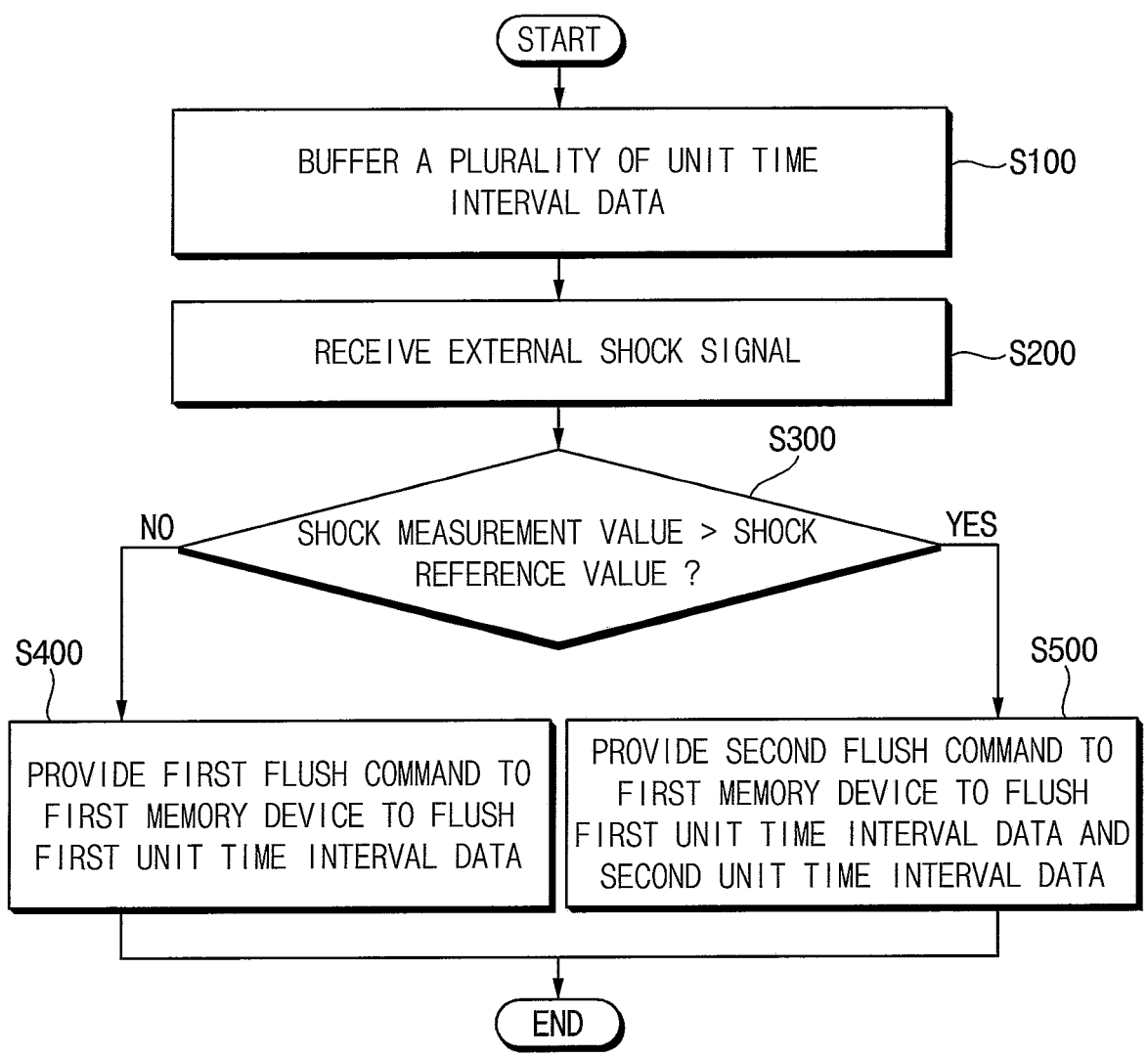
FIG. 17 is a flowchart illustrating a method of operating a storage device, according to example embodiments.

FIG. 17 is a flowchart illustrating a method of operating a storage device according to example embodiments.

Referring to FIG. 17, in a method of operating a storage device, a plurality of unit time interval data may be received in each of a plurality of monitoring time intervals for an autonomous driving control are buffered (S100). The S100 operation may be performed by the storage device 300 described above with reference to FIG. 1. For example, the storage device 300 may receive the plurality of unit time interval data, and may buffer the received plurality of unit time interval data.

Next, an external shock signal may be received (S200). The external shock signal may be generated by the shock sensor 340 described above with reference to FIG. 1. The external shock signal may include a shock measurement value.

When the shock measurement value is greater than a shock reference value (S300: NO), a first flush command is provided to a first memory device to flush only a first unit time interval data that are a portion of the plurality of unit time interval data to a second memory device (S400). The first memory device may be the first memory device 330 of FIG. 1, and the second memory device may be the second memory device 320 of FIG. 1.

When the shock measurement value is less than or equal to the shock reference value (S300: YES), a second flush command is provided to the first memory device to flush the first unit time interval data and a second unit time interval data that are different from the first unit time interval data and are another portion of the plurality of unit time interval data (S500). The S200, S300, S400, and S500 operations may be performed by the storage controller 310 described above with reference to FIG. 1. For example, the storage controller 310 may receive the external shock signal from the shock sensor 340, as described in operation S200. The storage controller 310 may compare the shock measurement value to the shock reference value to determine if the shock measurement value is greater than, less than, or equal to the shock reference value, as described in operation S300. In addition, the storage controller 310 may prepare and send the first and second flush commands to the first memory device 330, as described in operations S400 and S500.

Figure 18:
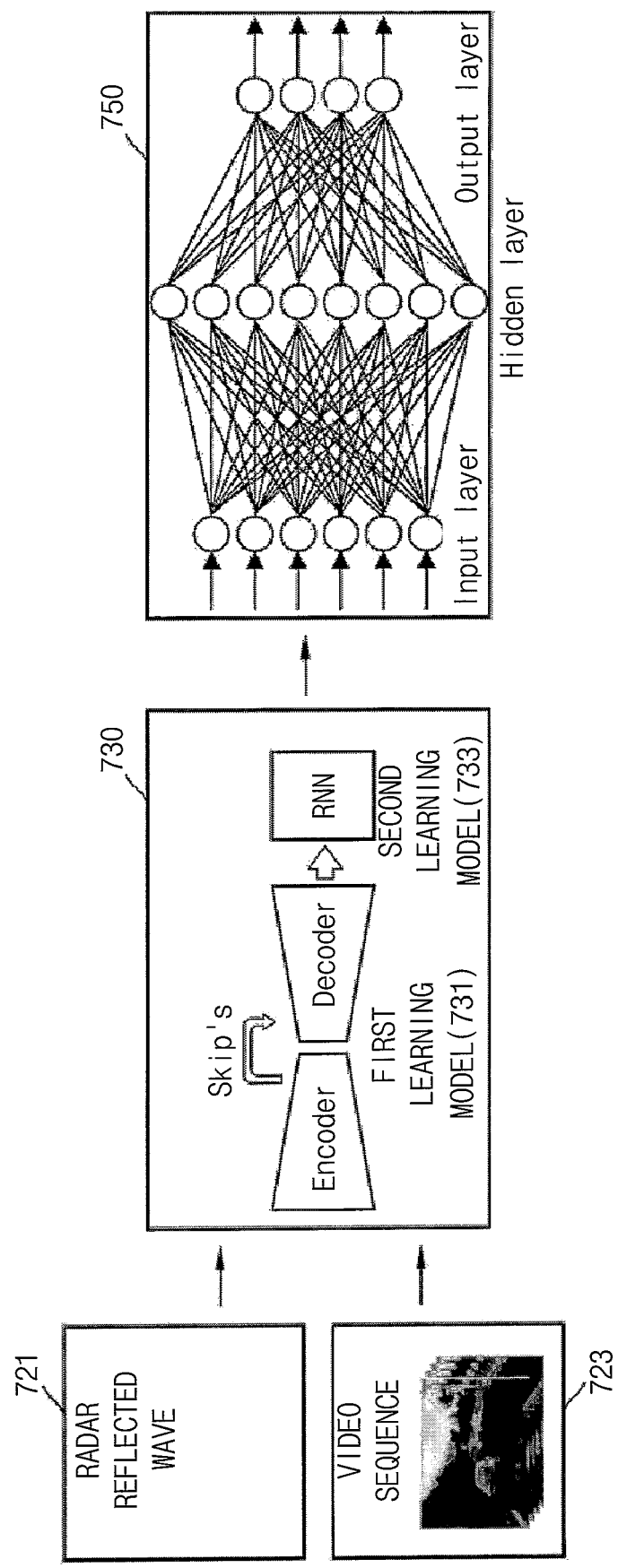
FIG. 18 is a diagram for describing an operation of a learning model used in a storage device, according to example embodiments.

FIG. 18 is a diagram for describing an operation of a learning model used in a storage device according to example embodiments.

In FIG. 18, a radar reflected wave 721, a video sequence 723, a learning model 730 including a first learning model 731 and a second learning model 733, and an artificial neural network 750 are illustrated.

In some embodiments, the radar reflected wave 721 may be generated as sensor data by a radar sensor that is one of the plurality of sensors 201, 202 and 203 described above with reference to FIG. 1, and the video sequence 723 may be generated as the sensor data by a camera sensor that is one of the plurality of sensors 201, 202 and 203 described above with reference to FIG. 1.

In some embodiments, the learning model 730 may be used to detect the first object described above with reference to FIG. 15. For example, the first learning model 731 may be generated by learning about a criterion for determining a type of the first object using a fully convolutional network (FCN), or the like. For example, the radar reflected wave 721 and the video sequence 723 may be used as input data of the first learning model 731. The first learning model 731 may be trained to display the first object included in a plurality of frames in the video sequence 723 as a bounding box by using the radar reflected wave 721 in an existing model trained using an encoder and a decoder. In this case, output data of the first learning model 731 may be used as input data of the second learning model 733, and a dimension of the output data of the first learning model 731 may be reduced. For example, the second learning model 733 may determine when the first object is detected by tracking the first object using a recurrent neural network (RNN), or the like.

The output of the second learning model 733 may be provided to the artificial neural network 750. The artificial neural network 750 may include an input layer, a hidden layer, and an output layer. The input layer may receive the output of the second learning model 733 as initial data for the artificial neural network 750, and the output layer may output the results of the artificial neural network 750. The hidden layer may be one or more hidden layers between the input layer and the output layer, where various computations may be performed.

Figure 19:
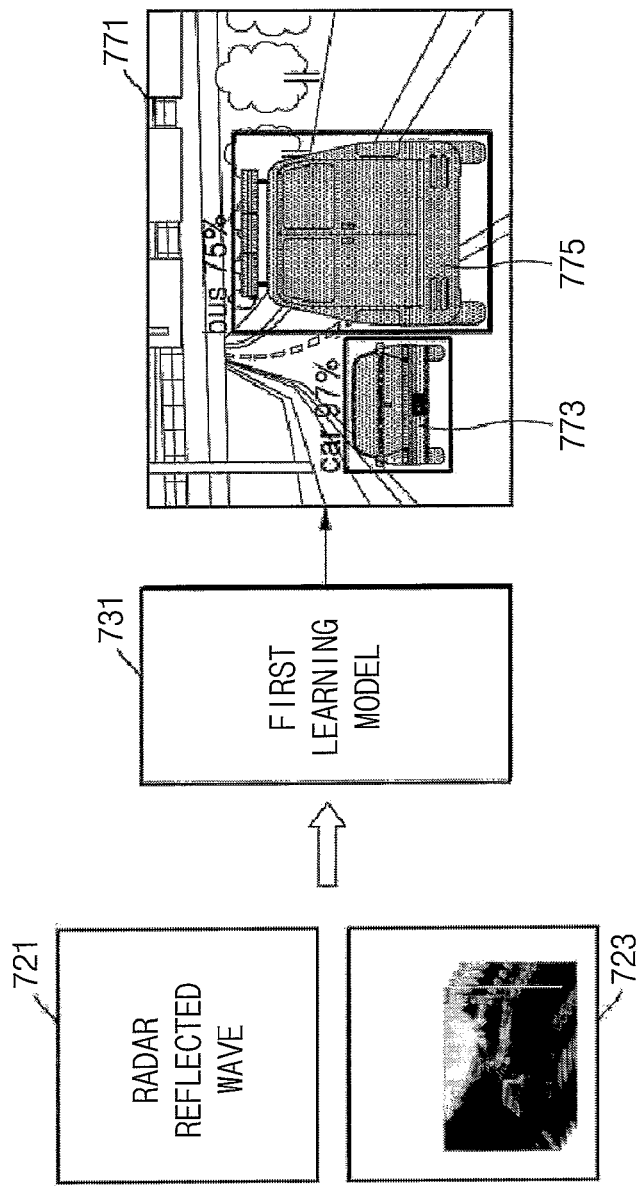
FIG. 19 is a diagram for describing a process of detecting the first object using the first learning model in FIG. 18.

FIG. 19 is a diagram for describing a process of detecting the first object using the first learning model in FIG. 18.

Referring to FIG. 19, a radar reflected wave 721 and a video sequence 723 including a plurality of frames acquired while an autonomous vehicle is driving may be input as input data of a first learning model 731 to detect a first object in the plurality of frames and display the detected first object as a bounding box 771.

In some embodiments, various objects included in the video sequence 723 may be expressed in different colors for each type based on output data output from the first learning model 731. For example, a road that forms a certain pattern and a vehicle that is a moving object may be expressed in different colors.

In some embodiments, a type and a location of the first object in the video sequence 723 output from the first learning model 731 may be determined. For example, an object 773 determined as the first object may be determined to correspond to a passenger car with an accuracy of 97%, and an object 775 determined as the first object may be determined to correspond to a bus with an accuracy of 75%.

Figure 20:
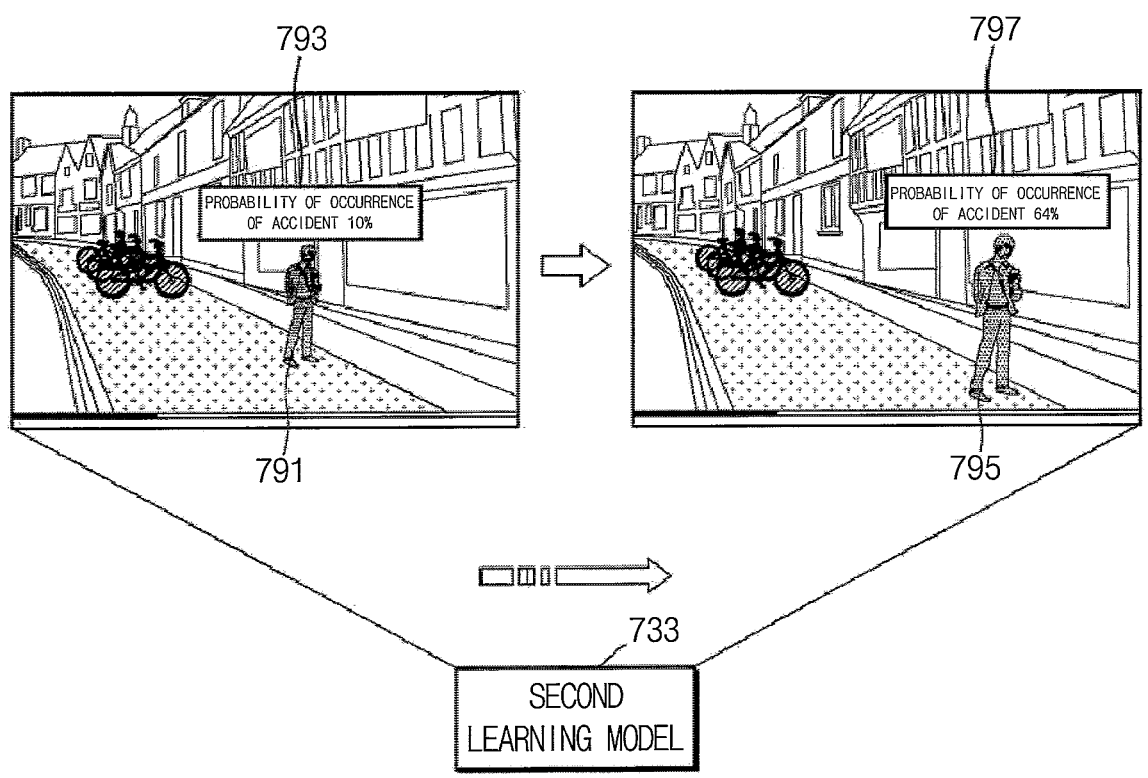
FIG. 20 is a diagram for describing a process of selecting one of flush commands using the second learning model in FIG. 18.

FIG. 20 is a diagram for describing a process of selecting one of flush commands using the second learning model in FIG. 18.

Referring to FIGS. 1, 18, and 20, a probability of occurrence of an accident associated with a first object may be calculated by inputting output data of the first learning model 731 output while an autonomous vehicle is driving as input data of the second learning model 733.

The probability of occurrence of the accident associated with the first object 791 at a first time point is only 10% (793), however, the probability of occurrence of the accident associated with the first object 795 at a second time point increases to 64% (797).

In some embodiments, a time interval including the second time point may be determined as the monitoring time interval described above with reference to FIG. 14. In this case, a storage controller (e.g., storage controller 310) may provide the third flush command FCMD3 described above with reference to FIGS. 1 and 8 to the first memory device MEMORY1 to retrieve all of the first data DAT1 corresponding to the third flush command FCMD3. The storage controller may provide a program command PCMD and the second data DAT2 corresponding to the program command PCMD to the second memory device MEMORY2. The second data DAT2 may correspond to all of the first data DAT1

FIG. 21 is a block diagram illustrating an electronic device including a storage device according to example embodiments.

Referring to FIG. 21, an electronic device 950 may include a processing circuit 1000, a communication interface (e.g., including communication circuitry) 1500, and a memory 1100. The electronic device 950 may further include an input interface (e.g., including input circuitry) 1700, an output interface (e.g., including output circuitry) 1200, a sensor 1400, and an audio/video (A/V) input interface (e.g., including A/V input circuitry) 1600.

The input interface 1700 may receive an input for controlling an operation of a module mounted in an autonomous vehicle.

The output interface 1200 may include various circuitry to output an audio signal, a video signal, and/or a vibration signal, and may include a display 1210, a sound output interface (e.g., including sound output circuitry) 1220, and a vibration motor 1230. According to an embodiment, the output interface 1200 may output a notification message as an audio, a video, and/or vibration.

The display 1210 may display and output information processed in the electronic device 950. For example, the display 1210 may display a notification message on a head up display (HUD) of the autonomous vehicle. The sound output interface 1220 may include various circuitry to output audio data received from the communication interface 1500 or stored in the memory 1100. Also, the sound output interface 1220 may output a sound signal (for example, a call signal reception sound, a message reception sound, a notification sound) related to functions performed in the electronic device 950. For example, the sound output interface 1220 may output an alarm sound for notifying about occurrence of an event.

The processing circuit 1000 may include various processing circuitry and control general operations of the electronic device 950, in general. For example, the processing circuit 1000 may generally control the user input interface 1700, the output interface 1200, the sensor 1400, the communication interface 1500, the A/V input interface 1600, or the like, by executing programs stored in the memory 1100. Also, the processing circuit 1000 may perform the functions of the electronic device 950, by executing the programs stored in the memory 1100. The processing circuit 1000 may include at least one processor. The processing circuit 1000 may include a plurality of processors or an integrated one processor, based on functions and operations thereof. According to example embodiments, the processing circuit 1000 may include at least one processor configured to execute at least one program stored in the memory 1100 to provide a notification message. The processing circuit 1000 may obtain a video sequence including a plurality of frames from a camera mounted in the autonomous vehicle via the communication interface 1500. The processing circuit 1000 may transmit a command configured to control an operation of a module mounted in the autonomous vehicle to the module mounted in the autonomous vehicle, based on a type of an event and a level of risk of driving the vehicle, via the communication interface 1500.

The sensor 1400 may include various sensors and sensing circuitry to sense a state of the electronic device 950, a state of a user, or a state around the electronic device 950, and may transmit sensed information to the processing circuit 1000.

The sensor 1400 may include various sensing circuitry, such as, for example, and without limitation, at least one of a magnetic sensor 1410, an acceleration sensor 1420, a temperature/humidity sensor 1430, an infrared sensor 1440, a gyroscope sensor 1450, a position sensor (for example, global positioning system (GPS)) 1460, an atmospheric sensor 1470, a proximity sensor 1480, and an RGB sensor 1490, but is not limited thereto.

The communication interface 1500 may include various communication circuitry including at least one component configured to enable the electronic device 950 to communicate with another electronic device (not shown) and a server (not shown). The other electronic device may be a computing device or a sensor, but is not limited thereto. For example, the communication interface 1500 may include a short-range wireless communication interface 1510, a mobile communication interface 1520, and a broadcasting receiving interface 1530.

The short-range wireless communication interface 1510 may include a Bluetooth communication interface, a Bluetooth low energy (BLE) communication interface, a near-field communication interface (NFC/RFID), a WLAN (Wi-fi) communication interface, a Zigbee communication interface, an infrared data association (IrDA) communication interface (not shown), a Wi-fi direct (WFD) communication interface, a ultra wideband (UWB) communication interface, an Ant+ communication interface, or the like, but is not limited thereto.

According to example embodiments, the communication interface 1500 may receive the video sequence including the plurality of frames from the camera mounted in the autonomous vehicle. The communication interface 1500 may transmit the command for controlling an operation of a module mounted in the autonomous vehicle to the module mounted in the autonomous vehicle.

The A/V input interface 1600 may include various A/V interface circuitry and is configured to input an audio signal or a video signal, and may include a camera 1610, a microphone 1620, or the like. The camera 1610 may obtain an image frame, such as a still image or a video, via an image sensor, in a video telephony mode or a photographing mode. The image captured by the image sensor may be processed by the processing circuit 1000 or an additional image processor (not shown). For example, the image captured by the camera 1610 may be used as information for determining whether an event occurs.

The microphone 1620 may receive an external sound signal and process the external sound signal as electrical sound data. For example, the microphone 1620 may receive the sound signal from an external device or the user. The microphone 1620 may use various noise-removal algorithms to remove noise generated in a process of receiving the external sound signal.

The memory 1100 may store programs for the processing and controlling operations of the processing circuit 1000, and may store data that is input to the electronic device 950 or output from the electronic device 950.

The memory 1100 may include at least one type of storage medium from among a flash memory type, a hard disk type, a multimedia card micro type. The programs stored in the memory 1100 may be divided into a plurality of modules based on their functions. For example, the programs may be divided into a user interface (UI) module 1110, a touch screen module 1120, and a notification module 1130.

The UI module 1110 may provide a specialized UI, a graphic user interface (GUI), etc., which are synchronized to the electronic device 950, for each application. The touch screen module 1120 may sense a touch gesture on a touch screen via the user, and transmit information related to the touch gesture to the processing circuit 1000. The touch screen module 1120 according to an embodiment may recognize and analyze a touch code. The touch screen module 1120 may be implemented as additional hardware including a controller.

The notification module 1130 may generate a signal to notify about occurrence of an event. The notification module 1130 may output the notification signal as a video signal via the display 1210, output the notification signal as an audio signal via the sound output interface 1220, or output the notification signal as a vibration signal via the vibration motor 1230.

The above-described various example embodiments are implemented by hardware components, software components or combinations of the hardware components and the software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A storage device comprising:
   a first memory device configured to buffer a plurality of unit time interval data that are received in each of a plurality of monitoring time intervals for an autonomous driving control;
   a second memory device configured to store at least one of the plurality of unit time interval data; and
   a storage controller configured to control an amount of data flushed from the first memory device to the second memory device based on one of first and second flush commands, configured to compare a shock measurement value representing a magnitude of an external shock with a shock reference value, configured to, when the shock measurement value is less than or equal to the shock reference value, provide the first flush command to the first memory device to flush first unit time interval data among the plurality of unit time interval data to the second memory device, and configured to, when the shock measurement value is greater than the shock reference value, provide the second flush command to the first memory device to flush the first unit time interval data and second unit time interval data among the plurality of unit time interval data to the second memory device.

2. The storage device of claim 1, wherein the storage controller includes:
   a shock sensor configured to sense the external shock applied to the storage device and to output the shock measurement value while an autonomous vehicle including the storage device is driving.

3. The storage device of claim 1, wherein the storage controller is configured to provide a third flush command to the first memory device to flush all of the plurality of unit time interval data to the second memory device regardless of the shock measurement value.

4. The storage device of claim 3, wherein the storage controller includes:

firmware configured to generate one of the first flush command, the second flush command, and the third flush command; and a processor configured to control the first memory device and the second memory device based on the firmware.

5. The storage device of claim 3, wherein the storage controller includes:

a host interface configured to communicate with an external host device;

a first memory interface configured to communicate with the first memory device; and a second memory interface configured to communicate with the second memory device, wherein the storage controller is configured to provide the first flush command to the first memory device through the first memory interface and provide a program command to the second memory device through the second memory interface to flush the first unit time interval data corresponding to the first flush command to the second memory device, and configured to provide the second flush command to the first memory device through the first memory interface and provide the program command to the second memory device through the second memory interface to flush the first unit time interval data and the second unit time interval data corresponding to the second flush command to the second memory device.

6. The storage device of claim 1, wherein the plurality of unit time interval data include a plurality of sensor data for each of the plurality of monitoring time intervals, and the plurality of sensor data are generated by a plurality of sensors included in an autonomous vehicle.

7. The storage device of claim 6, wherein the plurality of sensors include at least one of an acceleration sensor, a geomagnetic sensor, a position sensor, a barometric pressure sensor, a temperature/humidity sensor, a proximity sensor, an infrared sensor, a gyroscope sensor, a camera sensor, a radar sensor, and a lidar sensor.

8. The storage device of claim 6, wherein the plurality of monitoring time intervals are determined based on at least one of a driving time of the autonomous vehicle and the plurality of sensor data.

9. The storage device of claim 8, wherein:

the driving time of the autonomous vehicle includes a plurality of driving time intervals, and when the plurality of monitoring time intervals are determined based on the driving time of the autonomous vehicle, driving time intervals that are repeated every first cycle and selected from among the plurality of driving time intervals are determined as the plurality of monitoring time intervals.

10. The storage device of claim 8, wherein:

when the plurality of monitoring time intervals are determined based on the plurality of sensor data, the plurality of monitoring time intervals are determined based on an acceleration measurement value from an acceleration sensor included in the plurality of sensors and an acceleration reference value.

11. The storage device of claim 8, wherein:

when the plurality of monitoring time intervals are determined based on the plurality of sensor data, the plurality of monitoring time intervals are determined based on a first object detected from images generated by a camera sensor included in the plurality of sensors.

12. The storage device of claim 1, wherein:

the plurality of monitoring time intervals include first to X-th monitoring time intervals, where X is a natural number greater than or equal to two, and the first memory device is configured to buffer a plurality of sensor data generated in each of the first to the X-th monitoring time intervals until the first memory device is full.

13. The storage device of claim 1, wherein:

the plurality of monitoring time intervals include first to X-th monitoring time intervals, where X is a number greater than or equal to two, and when the first memory device buffers a plurality of sensor data generated in the K-th monitoring time interval, the first memory device is configured to delete a plurality of sensor data generated in the (K−1)-th monitoring time period, where K is a natural number greater than or equal to two and less than or equal to X.

14. The storage device of claim 1, wherein:

an amount of the first unit time interval data corresponding to the first flush command is 1/N of an amount of the first unit time interval data corresponding to the second flush command, where N is a natural number greater than or equal to two.

15. The storage device of claim 1, wherein:

the first memory device is one of a dynamic random access memory (DRAM) and a static random access memory (SRAM), the second memory device is a nonvolatile memory device, and the storage device is a solid state drive (SSD).

16. A storage system comprising:

a host device configured to store a plurality of unit time interval data that are received in each of a plurality of monitoring time intervals for an autonomous driving control, and configured to issue a write request for at least one of the plurality of unit time interval data; and a storage device including:

a first memory device configured to, based on the write request, buffer data transmitted from the host device among the plurality of unit time interval data;

a second memory device configured to store data flushed from the first memory device; and a storage controller configured to control the first memory device and the second memory device, wherein, when a predetermined first condition is satisfied, the host device is configured to transmit first unit time interval data among the plurality of unit time interval data to the storage device, and the storage controller is configured to flush the first unit time interval data from the first memory device to the second memory device.

17. The storage system of claim 16, wherein:

when the first condition is not satisfied, the host device is configured to transmit all of the plurality of unit time interval data to the storage device, and the storage controller is configured to control an amount of data flushed from the first memory device to the second memory device based on one of first and second flush commands, and configured to compare a shock measurement value representing a magnitude of an external shock with a shock reference value, configured to, when the shock measurement value is less than or equal to the shock reference value, provide the first flush command to the first memory device to flush the first unit time interval data to the second memory device, and configured to, when the shock measurement value is greater than the shock reference value, provide the second flush command to the first memory device to flush the first unit time interval data and second unit time interval data among the plurality of unit time interval data to the second memory device.

18. The storage system of claim 17, wherein the storage controller includes:
a shock sensor configured to sense the external shock applied to the storage device to output the shock measurement value while an autonomous vehicle including the storage device is driving.

19. The storage system of claim 16, wherein:
when the first condition is not satisfied, the storage controller is configured to provide a third flush command to the first memory device to flush all of the plurality of unit time interval data to the second memory device regardless of the shock measurement value.

20. A storage device comprising:
a first memory device configured to buffer a plurality of unit time interval data including a plurality of sensor data received in each of a plurality of monitoring time intervals for an autonomous driving control;
a second memory device configured to store at least one of the plurality of unit time interval data; and
a storage controller including a shock sensor that senses an external shock applied while an autonomous vehicle is driving and outputs a shock measurement value, configured to control an amount of data flushed from the first memory device to the second memory device based on one of first and second flush commands, configured to compare the shock measurement value with a shock reference value, configured to, when the shock measurement value is less than or equal to the shock reference value, provide the first flush command to the first memory device to flush first unit time interval data among the plurality of unit time interval data to the second memory device, configured to, when the shock measurement value is greater than the shock reference value, provide the second flush command to the first memory device to flush the first unit time interval data and second unit time interval data among the plurality of unit time interval data to the second memory device, and configured to provide a third flush command to the first memory device to flush all of the plurality of unit time interval data to the second memory device regardless of the shock measurement value.

* * * * *